US012712170B2

(12) United States Patent
McCabe et al.

(10) Patent No.: US 12,712,170 B2
(45) Date of Patent: Aug. 18, 2026

(54) ION MOBILITY SPECTROMETRY DEVICES HAVING HIGH CAPACITY REGIONS FOR ION ACCUMULATION PRIOR TO INTERMITTENT MASS ANALYSIS AND METHODS THEREFOR

(71) Applicant: MOBILion Systems, Inc., Chadds Ford, PA (US)

(72) Inventors: Jacob McCabe, Fiskdale, MA (US); Liulin Deng, Chester Springs, PA (US); John Daniel DeBord, West Grove, PA (US); Alexander A. Makarov, Bremen (DE); Kyle Fort, Bremen (DE); Brian D. Adamson, San Jose, CA (US); Eloy R. Wouters, San Jose, CA (US)

(73) Assignee: MOBILion Systems, Inc., Chadds Ford, PA (US)

( * ) Notice: Subject to any disclaimer, the term of this patent is extended or adjusted under 35 U.S.C. 154(b) by 407 days.

(21) Appl. No.: 18/511,211

(22) Filed: Nov. 16, 2023

(65) Prior Publication Data

US 2024/0170274 A1 May 23, 2024

Related U.S. Application Data

(60) Provisional application No. 63/426,108, filed on Nov. 17, 2022.

(51) Int. Cl.
*H01J 49/42* (2006.01)
*G01N 27/622* (2021.01)
(Continued)

(52) U.S. Cl.
CPC .......... *H01J 49/421* (2013.01); *G01N 27/622* (2013.01); *H01J 49/0031* (2013.01); *H01J 49/062* (2013.01)

(58) Field of Classification Search
CPC .... H01J 49/421; H01J 49/0031; H01J 49/062; G01N 27/622; G01N 27/624
See application file for complete search history.

(56) References Cited

U.S. PATENT DOCUMENTS 5,261,212 A * 11/1993 Debord .................... B68C 1/16
54/46.2
5,789,745 A 8/1998 Martin et al.
(Continued)

FOREIGN PATENT DOCUMENTS

EP 1942340 A1 7/2008
GB 2457769 A 9/2009
(Continued)

OTHER PUBLICATIONS

Brodeur et al., “Experimental Investigation of the Ion Surfing Transport Method,” Int'l Journal of Mass Spec., vol. 336, pp. 53-60, Feb. 2013 (8 pages).

(Continued)

*Primary Examiner* — David A Vanore
(74) *Attorney, Agent, or Firm* — McCarter & English, LLP; David J. Silvia

(57) ABSTRACT

An IMS device is provided that includes at least one surface, first and second pluralities of electrodes disposed on the surface, and an ion path having first and second accumulation regions and a separation region. The IMS device is configured to receive, guide, temporally separate, and discharge ions. Each accumulation region is configured to switch between accumulation and release states in which ions are accumulated and released therefrom, respectively. The separation region is positioned downstream of the first accumulation region and configured to temporally separate ions based on mobility. The first accumulation region is synchronized with a downstream mass filter while the second accumulation region is dependent upon the state of a (Continued)

gating element, which is positioned downstream of the IMS device and configured to control the flow of ions to a mass analyzer. A method in accordance with the foregoing is also provided.

24 Claims, 15 Drawing Sheets

(51) Int. Cl.
*H01J 49/00* (2006.01)
*H01J 49/06* (2006.01)

(56) References Cited

U.S. PATENT DOCUMENTS 6,107,628 A 8/2000 Smith et al.
6,791,078 B2 * 9/2004 Giles .................... G01N 27/623 250/281
6,794,641 B2 9/2004 Bateman et al.
6,800,846 B2 10/2004 Bateman et al.
6,812,453 B2 11/2004 Bateman et al.
6,872,939 B2 3/2005 Bateman et al.
6,884,995 B2 4/2005 Bateman et al.
6,891,157 B2 5/2005 Bateman et al.
6,914,241 B2 7/2005 Giles et al.
7,064,321 B2 6/2006 Franzen
7,071,467 B2 * 7/2006 Bateman ............. H01J 49/4225 250/292
7,095,013 B2 8/2006 Bateman et al.
7,154,088 B1 12/2006 Blain et al.
7,157,698 B2 1/2007 Makarov et al.
7,205,538 B2 4/2007 Bateman et al.
7,342,224 B2 3/2008 Makarov et al.
7,405,401 B2 * 7/2008 Hoyes ................... H01J 49/427 250/292
7,456,388 B2 * 11/2008 Loboda ................. H01J 49/062 250/396 R
7,456,394 B2 11/2008 Cameron et al.
7,459,693 B2 12/2008 Park et al.
7,491,930 B2 2/2009 Shvartsburg et al.
7,501,621 B2 * 3/2009 Willis ................. H01J 49/0036 250/281
7,507,953 B2 3/2009 Makarov et al.
7,514,676 B1 4/2009 Page et al.
7,671,344 B2 3/2010 Tang et al.
7,714,278 B2 5/2010 Boyle et al.
7,781,728 B2 8/2010 Senko et al.
7,829,841 B2 * 11/2010 Bateman ................. H01J 49/02 250/281
7,838,826 B1 11/2010 Park
7,888,635 B2 2/2011 Belov et al.
7,960,694 B2 6/2011 Hoyes
8,288,717 B2 10/2012 Park
8,299,443 B1 10/2012 Shvartsburg et al.
8,319,177 B2 11/2012 Boyle et al.
8,389,933 B2 3/2013 Hoyes
8,415,618 B2 4/2013 Hoyes
8,487,240 B2 7/2013 Koehl
8,507,852 B2 8/2013 Makarov
8,581,177 B2 11/2013 Kovtoun
8,648,293 B2 2/2014 Correale
8,742,339 B2 6/2014 Hoyes
8,809,769 B2 8/2014 Park
8,829,464 B2 9/2014 Hoyes et al.
8,835,839 B1 * 9/2014 Anderson ............. H01J 49/062 250/290
8,901,490 B1 12/2014 Chen et al.
8,907,272 B1 12/2014 Wouters et al.
8,907,273 B1 12/2014 Chen et al.
8,921,772 B2 12/2014 Verenchikov
8,941,054 B2 1/2015 Park et al.
8,941,055 B2 1/2015 Park et al.
8,946,626 B2 2/2015 Giles et al.
8,952,326 B1 2/2015 Ugarov
8,969,800 B1 3/2015 Tolmachev et al.
9,063,086 B1 6/2015 Garimella et al.
9,082,604 B2 7/2015 Verenchikov
9,123,516 B2 9/2015 Hasegawa et al.
9,123,518 B2 9/2015 Giles et al.
9,281,170 B2 3/2016 Park et al.
9,281,172 B2 3/2016 Bateman et al.
9,417,211 B2 8/2016 Verenchikov
9,425,035 B2 8/2016 Giles et al.
9,429,543 B2 8/2016 Jiang et al.
9,455,132 B2 9/2016 Mordehai et al.
9,546,980 B1 * 1/2017 Räther ................. G01N 27/623
9,683,964 B2 6/2017 Park et al.
9,704,701 B2 7/2017 Ibrahim et al.
9,741,552 B2 8/2017 Park et al.
9,761,427 B2 9/2017 Wouters et al.
9,799,503 B2 10/2017 Williams et al.
9,812,310 B2 11/2017 Kovtoun et al.
9,812,311 B2 11/2017 Anderson et al.
9,824,874 B2 11/2017 Ibrahim et al.
9,865,442 B2 1/2018 Giles et al.
9,880,129 B2 1/2018 Bateman
9,887,074 B2 2/2018 Belov
9,916,968 B1 3/2018 Kurulugama et al.
9,939,408 B2 4/2018 Giles et al.
9,939,409 B2 4/2018 Ibrahim et al.
9,966,244 B2 5/2018 Anderson et al.
10,018,592 B2 7/2018 Ibrahim et al.
10,032,617 B2 7/2018 Welkie
10,060,879 B2 8/2018 Silveira
10,192,728 B2 1/2019 Zhang et al.
10,224,194 B2 3/2019 Ibrahim et al.
10,224,196 B2 3/2019 Giles et al.
10,241,079 B2 3/2019 Betz et al.
10,317,362 B2 6/2019 Harder et al.
10,317,364 B2 6/2019 Garimella et al.
10,319,575 B2 6/2019 Brown et al.
10,332,723 B1 6/2019 Ibrahim et al.
10,371,665 B2 8/2019 Green et al.
10,408,792 B2 9/2019 Betz et al.
10,424,474 B2 9/2019 Ibrahim et al.
10,446,381 B2 10/2019 Giles et al.
10,460,920 B1 10/2019 Smith
10,466,202 B2 11/2019 Ibrahim et al.
10,473,620 B2 11/2019 Harder et al.
10,497,552 B2 12/2019 Ibrahim et al.
10,515,790 B2 12/2019 Cheng et al.
10,522,337 B2 12/2019 Rizzo et al.
10,586,691 B2 3/2020 Hoyes et al.
10,665,443 B2 5/2020 Ibrahim et al.
10,692,710 B2 6/2020 Prabhakaran et al.
10,720,315 B2 7/2020 Taghioskoui
10,741,375 B2 8/2020 Hamid et al.
10,804,089 B2 10/2020 Ibrahim et al.
10,811,243 B2 10/2020 Peterson et al.
10,811,244 B2 10/2020 Green et al.
10,840,077 B2 11/2020 Taghioskoui
10,861,687 B2 12/2020 Wildgoose et al.
10,903,062 B2 1/2021 Giles et al.
10,976,283 B2 4/2021 Ibrahim et al.
10,991,567 B2 4/2021 Langridge et al.
11,037,777 B2 6/2021 Cooks et al.
11,119,069 B2 9/2021 Ibrahim et al.
11,195,710 B2 12/2021 Park et al.
11,204,337 B2 12/2021 Ridgeway
11,209,393 B2 12/2021 Garimella et al.
11,255,817 B2 2/2022 Giles et al.
11,293,898 B2 4/2022 Prasad et al.
11,322,340 B2 5/2022 Hamid et al.
11,367,602 B2 6/2022 Richardson et al.
11,460,439 B2 10/2022 DeBord et al.
11,527,395 B2 12/2022 Giles et al.
11,543,384 B2 * 1/2023 DeBord ............... G01N 27/622
11,605,531 B2 3/2023 Ibrahim et al.
11,662,333 B2 * 5/2023 DeBord ............... G01N 27/623 250/282
11,670,495 B2 * 6/2023 DeBord .................. H01J 49/30 250/292

(56) References Cited

U.S. PATENT DOCUMENTS

| | | | | |
|---|---|---|---|---|
| 11,715,359 | B1* | 8/2023 | Schmidt | G08B 17/10 340/628 |
| 11,761,925 | B2 | 9/2023 | Garimella et al. | |
| 11,874,252 | B2* | 1/2024 | DeBord | H01J 49/062 |
| 11,953,466 | B2 | 4/2024 | DeBord et al. | |
| 2005/0253059 | A1* | 11/2005 | Goeringer | H01J 49/4205 250/281 |
| 2008/0308721 | A1 | 12/2008 | Senko et al. | |
| 2010/0084549 | A1 | 4/2010 | Ermakov et al. | |
| 2015/0228465 | A1 | 8/2015 | Bateman et al. | |
| 2016/0071715 | A1 | 3/2016 | Anderson et al. | |
| 2016/0109424 | A1* | 4/2016 | Johansen | G01N 33/6848 506/18 |
| 2017/0122906 | A1* | 5/2017 | Mann | H01J 49/004 |
| 2017/0212081 | A1* | 7/2017 | Green | H01J 49/004 |
| 2019/0004011 | A1 | 1/2019 | Garimella et al. | |
| 2019/0103261 | A1 | 4/2019 | Ibrahim et al. | |
| 2019/0348268 | A1 | 11/2019 | Hamid et al. | |
| 2019/0369049 | A1 | 12/2019 | Ridgeway | |
| 2019/0369050 | A1 | 12/2019 | Garimella et al. | |
| 2020/0051805 | A1* | 2/2020 | Ugarov | G01N 27/624 |
| 2020/0161119 | A1 | 5/2020 | Richardson et al. | |
| 2020/0200708 | A1 | 6/2020 | Ibrahim et al. | |
| 2020/0203142 | A1 | 6/2020 | Langridge et al. | |
| 2020/0321190 | A1 | 10/2020 | Ibrahim et al. | |
| 2020/0321208 | A1 | 10/2020 | Cooks et al. | |
| 2020/0326302 | A1* | 10/2020 | Räther | H01J 49/401 |
| 2020/0326304 | A1 | 10/2020 | Giles et al. | |
| 2020/0373139 | A1* | 11/2020 | DeBord | G01N 27/623 |
| 2020/0378922 | A1 | 12/2020 | Ibrahim et al. | |
| 2020/0381241 | A1 | 12/2020 | Park et al. | |
| 2020/0395202 | A1 | 12/2020 | Richardson et al. | |
| 2021/0080429 | A1* | 3/2021 | DeBord | G01N 27/622 |
| 2021/0156822 | A1* | 5/2021 | DeBord | G01N 27/622 |
| 2021/0310989 | A1* | 10/2021 | DeBord | G01N 27/622 |
| 2021/0351003 | A1* | 11/2021 | Garimella | H01J 27/022 |
| 2021/0364467 | A1* | 11/2021 | DeBord | H01J 49/16 |
| 2021/0382006 | A1* | 12/2021 | DeBord | H01J 49/061 |
| 2022/0074891 | A1* | 3/2022 | DeBord | H01J 49/025 |
| 2022/0128509 | A1 | 4/2022 | Giles et al. | |
| 2022/0163480 | A1 | 5/2022 | Palmer et al. | |
| 2022/0216045 | A1 | 7/2022 | Giles et al. | |
| 2022/0365026 | A1* | 11/2022 | Ugarov | G01N 27/623 |
| 2022/0365027 | A1 | 11/2022 | Makarov | |
| 2022/0373512 | A1 | 11/2022 | Prasad et al. | |
| 2023/0008420 | A1 | 1/2023 | Krioutchkov et al. | |
| 2023/0052193 | A1 | 2/2023 | Krioutchkov et al. | |
| 2023/0103674 | A1 | 4/2023 | DeBord et al. | |
| 2023/0187194 | A1* | 6/2023 | Deng | H01J 49/062 250/396 R |
| 2023/0268169 | A1 | 8/2023 | DeBord et al. | |
| 2023/0317442 | A1* | 10/2023 | Warnke | H01J 49/0045 250/282 |
| 2023/0349859 | A1* | 11/2023 | Green | G01N 27/622 |
| 2024/0003847 | A1 | 1/2024 | Garimella et al. | |
| 2024/0110891 | A1* | 4/2024 | DeBord | H01J 49/022 |
| 2024/0170274 | A1* | 5/2024 | McCabe | G01N 27/624 |

FOREIGN PATENT DOCUMENTS

| | | | | |
|---|---|---|---|---|
| WO | 2002/078046 | A2 | 10/2002 | |
| WO | 2004/068523 | A2 | 8/2004 | |
| WO | 2005/031290 | A2 | 4/2005 | |
| WO | 2006/103412 | A2 | 10/2006 | |
| WO | 2006/129083 | A2 | 12/2006 | |
| WO | 2009/147391 | A2 | 12/2009 | |
| WO | 2012/175517 | A2 | 12/2012 | |
| WO | 2013/092923 | A2 | 6/2013 | |
| WO | WO-2014174260 | A1 * | 10/2014 | G01N 27/622 |
| WO | 2020/201732 | A1 | 10/2020 | |
| WO | 2020/240197 | A1 | 12/2020 | |
| WO | 2020/243194 | A1 | 12/2020 | |
| WO | WO-2025147465 | A1 * | 7/2025 | G01N 27/622 |
| WO | WO-2026006650 | A1 * | 1/2026 | G01N 27/623 |

OTHER PUBLICATIONS

Donohoe, et al., "A New Ion Mobility-Linear Ion Trap Instrument for Complex Mixture Analysis," Anal. Chem., vol. 86, Iss. 16, pp. 8121-8128, Aug. 19, 2014 (17 pages).

F. W. Schmidlin, "A New Nonlevitated Mode of Traveling Wave Toner Transport," IEEE, Copyright 1988 (5 pages).

G. Bollen, "Ion Surfing' with Radiofrequency Carpets," Int'l Journal of Mass Spec., vol. 299, pp. 131-138, Jan. 2011 (8 pages).

Hamid et al., "Characterization of Traveling Wave Ion Mobility Separations in Structures for Lossless Ion Manipulations," Anal. Chem., 2015, 87, pp. 11301-11308, published Oct. 28, 2015 (8 pages).

Henderson et al., "ESI/Ion Trap/Ion Mobility/Time-of-Flight Mass Spectrometry for Rapid and Sensitive Analysis of Biomolecular Mixtures," Anal. Chem., vol. 71, Iss. 2, pp. 291-301, Jan. 15, 1999 (Abstract only—1 page).

Hoaglund-Hyzer et al., "Ion Trap/Ion Mobility/Quadrupole/Time-of-Flight Mass Spectrometry for Peptide Mixture Analysis," Anal. Chem., vol. 73, Iss. 2, pp. 177-184, Jan. 15, 2001 (Abstract only—1 page).

Ibrahim et al., "Development of a New Ion Mobility (Quadrupole) Time-of-Flight Mass Spectrometer," Int'l Journal of Mass Spectrometry, 377 (2015) 655-662, Jul. 28, 2014 (8 pages).

Jiang et al., "Ion Mobility—Mass Spectrometry," Encyclopedia of Anal. Chem., 2013, DOI: 10.1002/9780470027318.a9292 (21 pages).

Li et al., "Ion Mobility Spectrometry with High Ion Utilization Efficiency Using Traveling Wave-Based Structures for Lossless Ion Manipulations (SLIM)," poster presented at the Proceedings of the 68th ASMS Conference on Mass Spectrometry and Allied Topics, Online Meeting, Jun. 1-12, 2020 (1 page).

Li et al., "Ion Mobility Spectrometry with High Ion Utilization Efficiency Using Traveling Wave-Based Structures for Lossless Ion Manipulations," Anal. Chem., vol. 92, Iss. 22, pp. 14930-14938, Oct. 26, 2020 (9 pages).

Masuda et al., "Movement of Blood Cells in Liquid by Nonuniform Traveling Field," IEEE Transactions on Industry Applications, vol. 24, No. 2, pp. 217-222, Mar./Apr. 1988 (6 pages).

N. Agbonknkon, "Counter-flow Ion Mobility Analysis: Design, Instrumentation, and Characterization," Theses and Dissertations 1215, Nov. 14, 2007, https://scholarsarchive.byu.edu/etd/1215 (230 pages).

Wu et al., "Separation of Isomeric Peptides Using Electrospray Ionization/High-Resolution Ion Mobility Spectrometry," Anal. Chem., vol. 72, Iss. 2, pp. 391-395, Jan. 15, 2000 (Abstract only—1 page).

Zhang et al., "Ion Trapping, Storage, and Ejection in Structures for Lossless Ion Manipulations," Anal. Chem. 2015, 87, 6010-6016, May 14, 2015 (7 pages).

PCT International Search Report and Written Opinion dated Mar. 21, 2024, for Int'l App. No. PCT/US2023/080016 (8 pages).

* cited by examiner

Without Ion Accumulation in Ion Guide Accumulation Region 138

400

MS-only Mode

402

IM Separation with Ion Accumulation in Pre-IMS Accumulation Region 136

406

402

MS-only Mode

Relative Abundance

Time (min)

FIG. 6

ION MOBILITY SPECTROMETRY DEVICES HAVING HIGH CAPACITY REGIONS FOR ION ACCUMULATION PRIOR TO INTERMITTENT MASS ANALYSIS AND METHODS THEREFOR

CROSS-REFERENCE TO RELATED APPLICATIONS

The present application claims the benefit of priority to U.S. Provisional Patent Application Ser. No. 63/426,108, filed on Nov. 17, 2022, which is herein incorporated by reference in its entirety.

TECHNICAL FIELD

The present disclosure relates generally to the fields of ion mobility spectrometry (IMS) and mass spectrometry (MS). More specifically, the present disclosure relates to IMS/ion transfer devices having high capacity regions for ion accumulation prior to intermittent mass analysis and methods therefor.

BACKGROUND

IMS is a technique for separating and identifying ions in gaseous phase based on their mobilities. For example, IMS can be employed to separate structural isomers and macromolecules that have different mobilities. IMS relies on applying a constant or a time-varying electric field to a mixture of ions within a static or dynamic background gas. An ion having a larger mobility (or smaller collision cross section [CCS]) moves faster under the influence of the electric field compared to an ion with a smaller mobility (or larger CCS). By applying the electric field over a separation distance of an IMS device, ions from an ion mixture can be temporally or spatially separated based on their mobility. Structures for Lossless Ion Manipulation (SLIM), conventionally referred to as SLIM devices, are one type of IMS system or IMS devices that can be used to separate ions or to transfer ions along distances without separation.

IMS systems, such as SLIM devices, can be combined with mass spectrometers or mass analyzers, which receive a stream of ions from the IMS system, detect the received ions, and generate a mass spectrum therefrom. Some mass spectrometers/analyzers include ion optics, e.g., a split lens, positioned between the IMS system and the mass spectrometer. The ion optics can control the transfer of ions to the mass spectrometer. In particular, the ion optics can be opened to permit ions to enter the mass spectrometer/analyzer, or can be closed to prevent ions from entering the mass spectrometer/analyzer. However, when the ion optics are closed, all ions provided thereto are eliminated and lost. This reduces the overall duty cycle of the IMS-MS system, as a portion of the stream of ions provided by the SLIM device are eliminated by the ion optics.

Accordingly, there is a need for systems and methods that prevent ion loss resulting from the elimination of ions by ion optics of mass spectrometers/analyzers.

SUMMARY

The present disclosure relates to IMS/ion transfer devices having high capacity regions for ion accumulation prior to intermittent mass analysis and methods therefor.

In accordance with embodiments of the present disclosure, ion transfer devices are provided. An ion transfer device includes at least one surface, a first plurality of electrodes disposed on the at least one surface, a second plurality of electrodes disposed on the at least one surface, and an ion path adjacent the at least one surface and extending between an inlet and an outlet. The first plurality of electrodes are configured to receive a first voltage signal and generate at least a portion of a first pseudopotential that inhibits ions from approaching the at least one surface, and the second plurality of electrodes are configured to receive a second voltage signal and generate a drive potential. The ion path includes a separation region and an accumulation region downstream of the separation region. The separation region is configured to temporally separate ions based on mobility while the accumulation region is configured to receive the temporally separated ions from the separation region and switch between a first state, e.g., an accumulation state, and a second state, e.g., a release state. The ion transfer device is configured to receive a sample of ions, guide the ions through the ion path, temporally separate the ions, and discharge the ions. The accumulation region is configured to accumulate ions when in the accumulation state and permit ions to pass there through and exit the ion transfer device when in the release state, e.g., release the accumulated ions therefrom. The state of the accumulation region is substantially synchronized with the state of a gating element, which is positioned downstream of the ion transfer device and configured to control the flow of ions to a mass analyzer, such that the state of the accumulation region is dependent upon the state of the gating element.

In some aspects, the accumulation region can be configured to be switched to the second state, e.g., release state, when the gating element is in an open state in which ions are permitted to flow through the gating element, and to be switched to the first state, e.g., accumulation state, when the gating element is in a closed state in which ions are prevented from flowing through the gating element.

In other aspects, the ion transfer device can include a controller in communication with the ion transfer device. In such aspects, the controller can be configured to control the state of the accumulation region. In this regard, the controller can receive a signal indicative of the state of the gating element and control the state of the accumulation region based on the received signal.

In some other aspects, the ion transfer device can include an electrode gate positioned adjacent the accumulation region. The electrode gate can be configured to be switched between a first state in which it generates a first electric field and a second state in which it generates a second electric field. In some aspects, the first electric field can be a DC potential gradient or a traveling wave, while the second electric field can be a DC voltage, for example. The electrode gate can include a plurality of traveling wave electrodes, and the first electric field can be a traveling wave. In some of these aspects, the first electric field can be configured to guide the ions along the ion path while the second electric field can be configured to prevent the ions from traversing the electrode gate in order to cause ions to accumulate in the accumulation region. Additionally, the state of the electrode gate can be substantially synchronized with and dependent upon the state of the gating element. In this regard, the electrode gate can be configured to be switched to the first state when the gating element is in an open state in which ions are permitted to flow through the gating element, and to be switched to the second state when the gating element is in a closed state in which ions are prevented from flowing through the gating element. Additionally, in such aspects, the ion transfer device can include a controller in communication with the ion transfer device and configured to control the electrode gate. In this regard, the controller can receive a signal indicative of the state of the gating element and control the electrode gate based on the received signal. Also, in such aspects, the controller can be configured to apply a third voltage signal to the electrode gate to cause the electrode gate to operate in the first state and generate the first electric field, and to apply a fourth voltage signal to the electrode gate to cause the electrode gate to operate in the second state and generate the second electric field. The third voltage signal can be the same as the second voltage signal, and the first electrical field can be same as the drive potential.

In some aspects, the ion transfer device can include a controller and a logic circuit connected to the gating element and the controller. The logic circuit can be configured to receive a signal indicative of the state of the gating element, generate a synchronization signal based on the received signal, and transmit the synchronization signal to the controller. Additionally, the controller can be configured to control the state of the accumulation region based on the synchronization signal.

In some other aspects, a portion of the ion path adjacent the accumulation region can have a first width and the accumulation region can have a second width that is greater than the first width.

In still other aspects, the at least one surface can include a first surface and a second surface parallel to the first surface. The first plurality of electrodes can include a first plurality of rows of RF electrodes, and the second plurality of electrodes can include a first plurality of traveling wave electrodes. The ion transfer device can also include a second plurality of rows of traveling wave electrodes disposed on the second surface, and a second plurality of rows of RF electrodes disposed on the second surface. In such aspects, the ion path can be defined between the first surface and the second surface. In some such aspects, the ion transfer device can include a third plurality of rows of traveling wave electrodes disposed on the first surface at the accumulation region, a third plurality of rows of RF electrodes disposed on the first surface at the accumulation region, a fourth plurality of rows of traveling wave electrodes disposed on the second surface at the accumulation region, and a fourth plurality of rows of RF electrodes disposed on the second surface at the accumulation region. In such aspects, each of the third plurality of rows of traveling wave electrodes and the third plurality of rows of RF electrodes can include more rows than the first plurality of rows of traveling wave electrodes and the first plurality of rows of RF electrodes, and each of the fourth plurality of rows of traveling wave electrodes and the fourth plurality of rows of RF electrodes can include more rows than the second plurality of rows of traveling wave electrodes and the second plurality of rows of RF electrodes.

In some other aspects, the ion transfer device can have a 100% duty cycle.

In still other aspects, the ion path can include a pre-separation accumulation region upstream of the separation region, which can be configured to receive ions and switch between a first and a second state, e.g., an accumulation state and a release state. In this regard, when the pre-separation accumulation region is in the first state it can accumulate ions therein, and when it is in the second state it can permit ions to pass there through into the separation region.

In accordance with embodiments of the present disclosure, a method of accumulating and releasing ions with an ion transfer device based on a state of a downstream gating element configured to control the flow of ions to a mass analyzer is provided. The method involves introducing ions into the ion transfer device, which includes at least one surface, a first plurality of electrodes disposed on the at least one surface, a second plurality of electrodes disposed on the at least one surface, and an ion path extending between an inlet and an outlet. The ion path includes a separation region and an accumulation region downstream of the separation region. The separation region is configured to temporally separate ions based on ion mobility, and the accumulation region is configured to receive the temporally separated ions from the separation region and switch between a first state, e.g., an accumulation state, and a second state, e.g., a release state. The method further includes guiding the ions along the ion path and temporally separating the ions based on ion mobility as they are guided through the separation region. The accumulation region receives the temporally separated ions. The ion transfer device receives a signal indicative of the state of the gating element, and the accumulation region is caused to operate in one of the first state and the second state based on the received signal. When in the first state, the accumulation region accumulates ions therein. When in the second state, the accumulation region releases accumulated ions therefrom.

In some aspects, causing the accumulation region to operate in one of the first state, e.g., the accumulation state, and the second state, e.g., the release state, based on the received signal can include causing the accumulation region to operate in the first state when the signal is indicative of the gating element being in a closed state in which ions are prevented from flowing through the gating element and causing the accumulation region to operate in the second state when the signal is indicative of the gating element being in an open state in which ions are permitted to flow through the gating element.

In some other aspects, the ion transfer device can include an electrode gate positioned adjacent the accumulation region. In such aspects, causing the accumulation region to operate in one of the first state and the second state based on the received signal can involve generating a first electric field with the electrode gate to cause the accumulation region to operate in the second state, and generating a second electric field with the electrode gate to cause the accumulation region to operate in the first state. In such aspects, the first electric field can be configured to guide ions along the ion path and the second electric field can be configured to prevent the ions from traversing the electrode gate to cause the ions to accumulate in the accumulation region. Additionally, in such aspects, the electrode gate can generate the first electric field when the signal is indicative of the gating element being in an open state in which ions are permitted to flow through the gating element, and the electrode gate can generate the second electric field when the signal is indicative of the gating element being in a closed state in which ions are prevented from flowing through the gating element. In such aspects, the first electric field can be the same as the drive potential. In some of the foregoing aspects, the first electric field can be a DC potential gradient or a traveling wave, while the second electric field can be a DC voltage. Additionally and/or alternatively, the electrode gate can include a plurality of traveling wave electrodes and the first electric field can be a traveling wave.

In some other aspects, the method can involve receiving a gating element signal at a logic circuit connected to the gating element and a controller in communication with the ion transfer device, inverting the gating signal with the logic circuit to generate the signal, and transmitting the signal to the controller.

In some other aspects, a portion of the ion path adjacent the accumulation region can have a first width and the accumulation region can have a second width that is greater than the first width.

In still other aspects, the at least one surface can include a first surface and a second surface parallel to the first surface. The first plurality of electrodes can include a first plurality of rows of RF electrodes disposed on the first surface and the second plurality of electrodes can include a first plurality of rows of traveling wave electrodes. Additionally, the ion transfer device can include a second plurality of rows of traveling wave electrodes disposed on the second surface and a second plurality of rows of RF electrodes disposed on the second surface. In such aspects, the ion path can be defined between the first surface and the second surface. In some such aspects, the ion transfer device can include a third plurality of rows of traveling wave electrodes disposed on the first surface at the accumulation region, a third plurality of rows of RF electrodes disposed on the first surface at the accumulation region, a fourth plurality of rows of traveling wave electrodes disposed on the second surface at the accumulation region, and a fourth plurality of rows of RF electrodes disposed on the second surface at the accumulation region. In such aspects, each of the third plurality of rows of traveling wave electrodes and the third plurality of rows of RF electrodes can include more rows than the first plurality of rows of traveling wave electrodes and the first plurality of rows of RF electrodes, and each of the fourth plurality of rows of traveling wave electrodes and the fourth plurality of rows of RF electrodes can include more rows than the second plurality of rows of traveling wave electrodes and the second plurality of rows of RF electrodes.

In some other aspects, the ion transfer device can have a 100% duty cycle.

In some further aspects, the method can also involve accumulating ions introduced into the ion transfer device in a pre-separation accumulation region that is upstream of the separation region, configured to receive ions, and can be switched between a first state and a second state. Such aspects can also involve releasing ions from the pre-separation accumulation region into the separation region.

In accordance with embodiments of the present disclosure, an IMS device is provided. The IMS device includes at least one surface, a first plurality of electrodes disposed on the at least one surface, a second plurality of electrodes disposed on the at least one surface, and an ion path adjacent the at least one surface and extending between an inlet and an outlet. The first plurality of electrodes are configured to receive a first voltage signal and generate at least a portion of a first pseudopotential that inhibits ions from approaching the at least one surface, and the second plurality of electrodes are configured to receive a second voltage signal and generate a drive potential. The ion path includes a first accumulation region, a separation region, and a second accumulation region. The first accumulation region is configured to switch between a first accumulation state and a first release state, such that the first accumulation region accumulates ions when in the accumulation state and permits ions to pass therethrough when in the release state. The first accumulation region is synchronized with a mass filter downstream of the IMS device. The separation region is positioned downstream of the first accumulation region and configured to temporally separate ions based on mobility. The second accumulation region is downstream of the separation region, and configured to receive the temporally separated ions from the separation region and switch between a second accumulation state in which the second accumulation region accumulates ions and a second release state in which ions are permitted to pass therethrough. The state of the second accumulation region is dependent upon the state of a gating element positioned downstream of the IMS device and configured to control the flow of ions to a mass analyzer. The IMS device is configured to receive a sample of ions, guide the ions through the ion path, temporally separate the ions, and discharge the ions.

In some aspects, synchronization of the first accumulation region with the mass filter can include linking at least one aspect of the mass filter with the state or a change in the state of the first accumulation region. The at least one aspect can include operation of the mass filter, such as at least one ion filtering operation. Alternatively, the at least one aspect can be a timing for starting and stopping at least one ion filtering operation. In other aspects, synchronization of the first accumulation region with the mass filter can include linking an ion arrival time at the mass filter with the state or a change in the state of the first accumulation region.

In other aspects, the second accumulation region can be configured to accumulate ions regardless of ion charge state or m/z.

In still other aspects, the IMS device can include the mass filter. In some other aspects, the IMS device can have a duty cycle approaching 100%.

In accordance with embodiments of the present disclosure, a method of accumulating and releasing ions with an IMS device based on a state of a downstream gating element configured to control the flow of ions to a mass analyzer is provided. The method involves introducing ions into the IMS device, which includes at least one surface, a first plurality of electrodes disposed on the at least one surface, a second plurality of electrodes disposed on the at least one surface, and an ion path extending between an inlet and an outlet. The ion path includes a first accumulation region, a separation region, and a second accumulation region downstream of the separation region. The first accumulation region is configured to switch between a first accumulation state and a first release state. The separation region is configured to temporally separate ions based on ion mobility. The second accumulation region is configured to receive the temporally separated ions from the separation region and switch between a second accumulation state and a second release state. The method further includes guiding the ions along the ion path, accumulating ions in the first accumulation region, releasing the accumulated ions from the first accumulation region into the separation region, and temporally separating the ions based on ion mobility as they are guided through the separation region. The method further includes synchronizing a mass filter downstream of the IMS device with the first accumulation region. The accumulation region receives the temporally separated ions. The IMS device receives a signal indicative of the state of the gating element, and the accumulation region is caused to operate in one of the second accumulation state and the second release state based on the received signal.

In some aspects, the step of synchronizing the mass filter with the first accumulation region can include linking at least one aspect of the mass filter with the state or a change in the state of the first accumulation region. The at least one aspect can be an operation of the mass filter, such as an at least one ion filtering operation. Alternatively, the at least one aspect can be a timing for starting and stopping at least one ion filtering operation. In other aspects, the step of synchronizing the mass filter with the first accumulation region can include linking an ion arrival time at the mass filter with the state or a change in the state of the first accumulation region.

In other aspects, the second accumulation region can be configured to accumulate ions regardless of ion charge state or m/z. In some other aspects, the IMS device can have a duty cycle approaching 100%.

Other features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

The foregoing features of the present disclosure will be apparent from the following Detailed Description of the Invention, taken in connection with the accompanying drawings, in which.

DETAILED DESCRIPTION

The present disclosure relates to IMS/ion transfer devices having high capacity regions for ion accumulation prior to intermittent mass analysis and methods therefor, as described in detail below in connection with FIGS. 1-14.

Figure 1:
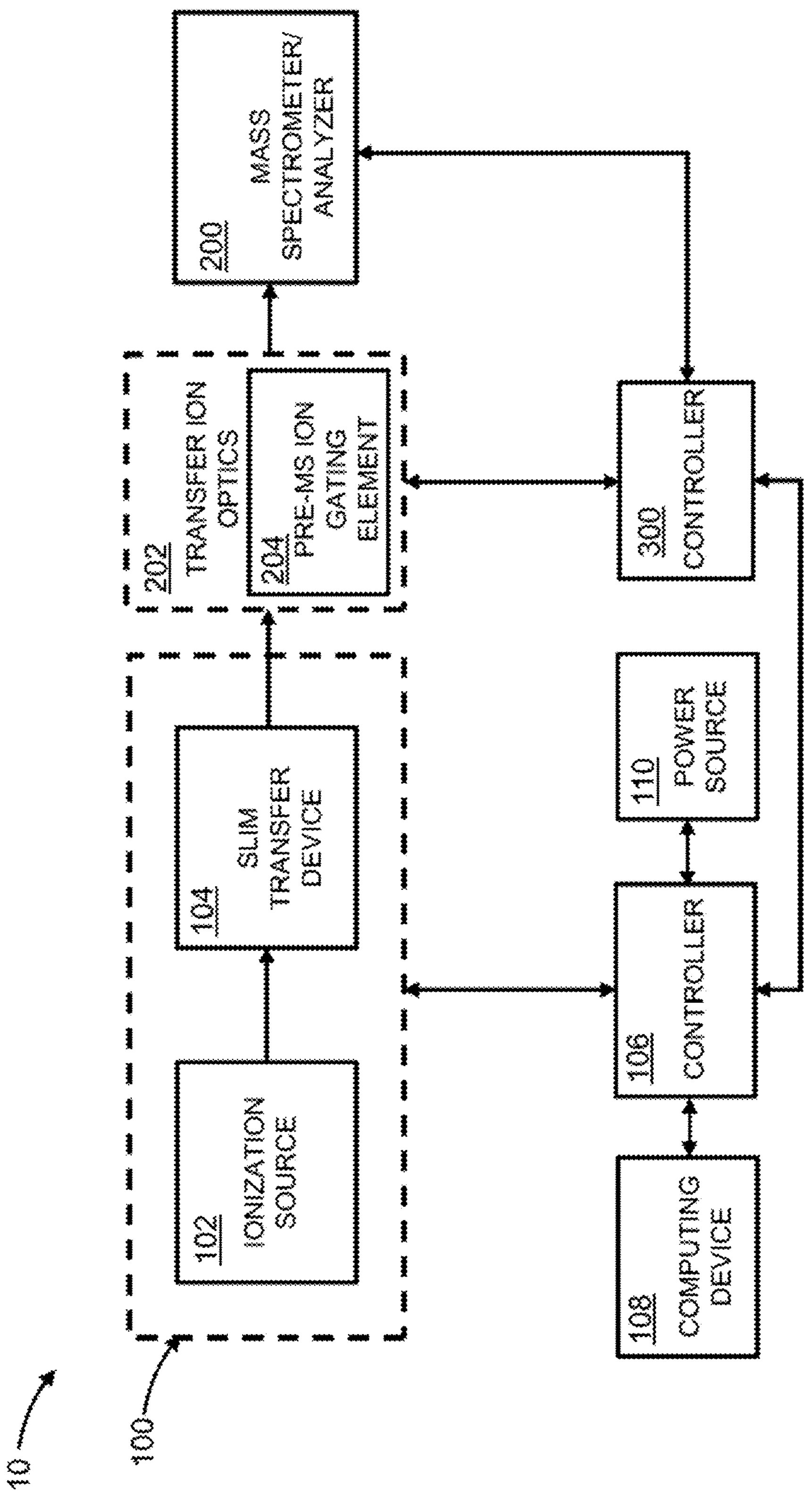
FIG. 1 is a schematic diagram of an exemplary ion mobility spectrometry (IMS)-mass spectrometry (MS) system (IMS-MS system) of the present disclosure.

FIG. 1 is a schematic diagram of an exemplary IMS-MS system 10 in accordance with the present disclosure. The system 10 includes an IMS system 100, a first controller 106, a computing device 108, a power source 110, a mass spectrometer/analyzer 200, transfer ion optics 202, and a second controller 300, which can include a logic circuit 302 (shown in FIG. 5).

The IMS system 100 includes an ionization source 102 and a SLIM transfer device 104. The ionization source 102 can generate ions (e.g., ions having varying mobility and mass-to-charge-ratios) and inject the ions into the SLIM transfer device 104 (discussed in connection with FIGS. 2-3). For example, the ionization source 102 can create ions that are drawn into a vacuum system through a transfer capillary and ion funnel (not shown), which can focus the ions and transfer the ions to the SLIM transfer device 104. The SLIM transfer device 104 can be, for example, a SLIM device or a high-resolution ion mobility (HRIM) SLIM device that can either transfer ions or separate ions based on their mobility via IMS, such as the devices disclosed and described in U.S. Pat. No. 8,835,839 entitled "Method and Apparatus for Ion Mobility Separations Utilizing Alternating Current Waveforms" and U.S. Pat. No. 10,317,364 entitled "Ion Manipulation Device," both of which are incorporated herein in their entirety. That is, the SLIM transfer device 104 can be utilized in an MS-only mode to transfer ions to the transfer ion optics 202 without mobility-based separation or can be utilized in an IM mode in which it functions as an IMS device that temporally/spatially separates ions based on their mobility prior to transferring the ions to the transfer ion optics 202 preceding the mass spectrometer/analyzer 200. Additionally, when operated in either MS-only mode or IM mode, the SLIM transfer device 104 can accumulate ions prior to transferring the ions to the transfer ion optics 202. In this regard, different waveforms can be applied to different regions of the SLIM transfer device 104, e.g., to one or more electrodes grouped together, to generate a gate or trapping region and trap ions in an accumulation region, as discussed in greater detail below.

Figure 2:
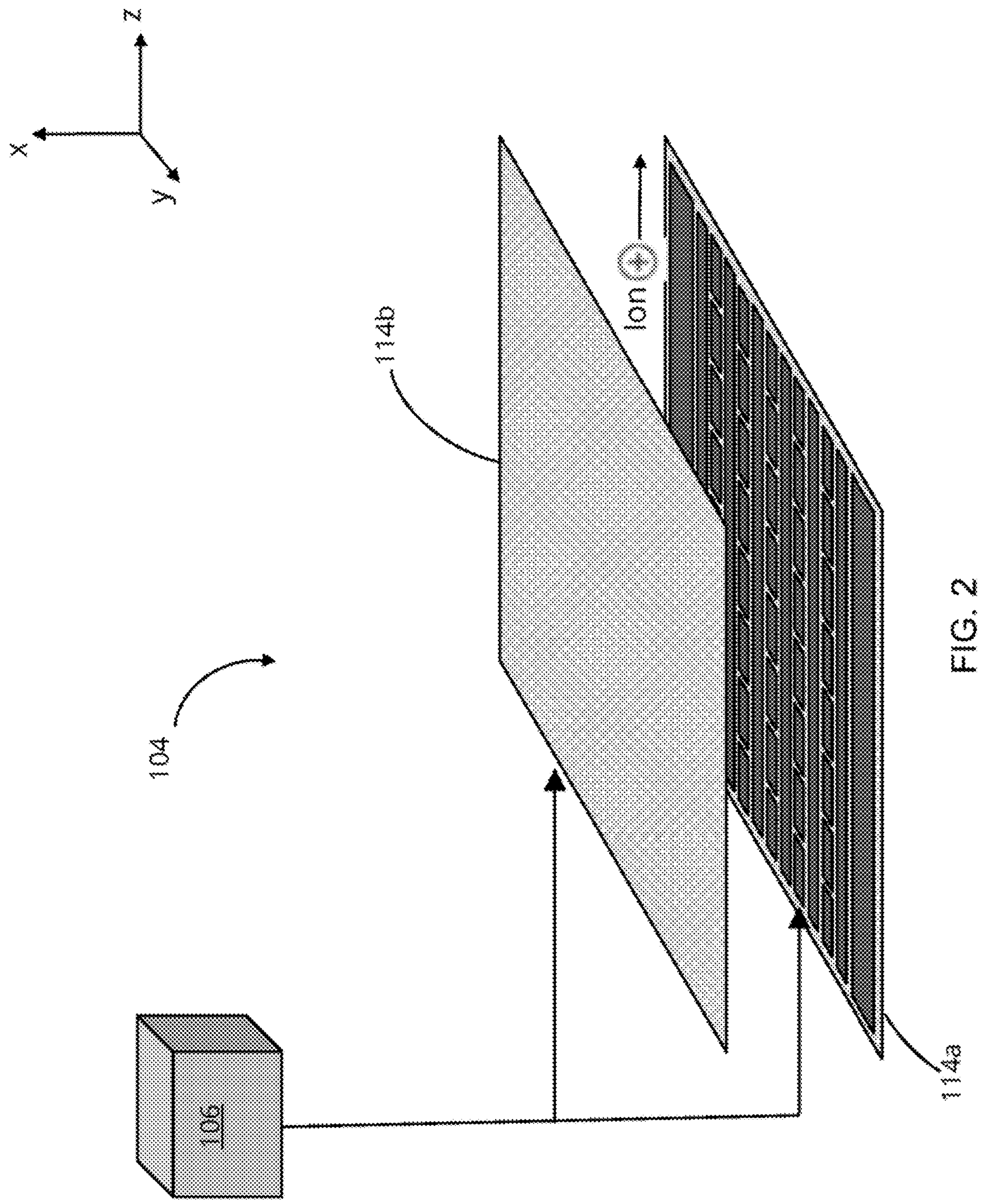
FIG. 2 a diagrammatic view of a portion of a SLIM transfer device that can be used with the IMS-MS system of FIG. 1 of the present disclosure.

As shown in FIG. 2, the SLIM transfer device 104 can include one or more surfaces 114*a*, 114*b* (e.g., printed circuit board surfaces) that can have a plurality of electrodes arranged thereon. The electrodes can receive voltage signals, a voltage waveform, and/or a current waveform (e.g., a DC voltage or current, an RF voltage or current, or an AC voltage or current, or a superposition thereof), and can generate a potential (e.g., a potential gradient) to confine ions in the SLIM transfer device 104, accumulate ions in the SLIM transfer device 104, and guide ions through the SLIM transfer device 104, which can result in the accumulation, transfer, and/or separation of ions based on their mobility, depending on the applied electrical signals, as discussed in greater detail below.

The first controller 106 can control operation of the ionization source 102 and the SLIM transfer device 104, e.g., based on whether the SLIM transfer device 104 is to be operated in MS-only mode or IM mode. For example, the first controller 106 can control the rate of injection of ions into the SLIM transfer device 104 by the ionization source 102, a mobility range of the SLIM transfer device 104, and the characteristics and motion of potential waveforms generated by the SLIM transfer device 104 (e.g., by applying RF/AC/DC potentials to the electrodes of the SLIM transfer device 104) in order to transfer, accumulate, and/or separate ions. The first controller 106 can control the properties of the potential waveforms (e.g., amplitude, shape, frequency, etc.) by varying the properties of the applied RF/AC/DC potential (or current). In this regard, the first controller 106 can vary the properties of the potential waveforms for different regions of the SLIM transfer device 104, e.g., different groupings of electrodes, to trap/accumulate ions and separate ions. This can be done in an effort to accumulate ions within the SLIM transfer device 104 and synchronize the release of the accumulated ions from the SLIM transfer device 104 with the operational state of a pre-MS ion gating element 204 of the ion optics 202, e.g., when it is open to ensure that the ions will pass there through. The pre-MS ion gating element 204 can be, for example, a gating electrode.

The first controller 106 can receive power from the power source 110, which can be, for example, a DC power source that provides DC voltage to the first controller 106. The first controller 106 can include multiple power supply modules (e.g., current and/or voltage supply circuits) that generate various voltage (or current) signals that drive the electrodes of the SLIM transfer device 104. For example, the first controller 106 can include RF control circuits that generate RF voltage signals, traveling wave control circuits that generate traveling wave voltage signals (e.g., AC signals), DC control circuits that generate DC voltage signals, etc. The RF voltage signals, traveling wave voltage signals, and DC voltage signals can be applied to the electrodes of the SLIM transfer device 104. The first controller 106 can also include a master control circuit that can control the operation of the RF/traveling wave/DC control circuits. For example, the master control circuit can control the amplitude and/or phase of voltage (or current) signals generated by the RF/traveling wave/DC control circuits to achieve a desirable operation of the IMS system 100.

In some implementations, the first controller 106 can be communicatively coupled to a computing device 108. For example, the computing device 108 can provide operating parameters of the IMS system 100 via a control signal to the master control circuit. In some implementations, a user can provide the computing device 108 (e.g., via a user interface) with the operating parameters. Based on the operating parameters received via the control signal, the master control circuit can control the operation of the RF/AC/DC control circuits which in turn can determine the operation of the coupled SLIM transfer device 104. In some implementations, RF/AC/DC control circuits can be physically distributed over the IMS system 100. For example, one or more of the RF/AC/DC control circuits can be located in the IMS system 100, and the various RF/AC/DC control circuits can operate based on power from the power source 110.

The second controller 300 can control operation of the mass spectrometer/analyzer 200, transfer ion optics 202 (hereinafter "ion optics"), and other components associated with the mass spectrometer/analyzer 200, discussed in greater detail below. The ion optics 202 can include several different components configured to transfer the ions from the SLIM transfer device 104 to the mass spectrometer/analyzer 200 including the pre-MS ion gating element 204. The pre-MS ion gating element 204 can be, for example, a split lens. However, it should be understood that while the pre-MS ion gating element 204 is occasionally referred to herein as a split lens, other ion optics are also contemplated by the present disclosure, including, but not limited to conductance limits/apertures, deflectors, beam, benders, slicers, or other ion optics elements capable of preventing ion beam transmission. The second controller 300 can communicate with the first controller 106, and can include the logic circuit 302, which assists with synchronization of the pre-MS ion gating element 204 and the SLIM transfer device 104.

FIG. 2 is a diagrammatic view of a portion of an exemplary SLIM transfer device 104 (e.g., SLIM device 104 for transferring ions, accumulating ions, storing ions, and/or separating ions) that can be used with the IMS system 100 of FIG. 1. The SLIM transfer device 104 includes a first surface 114*a* and a second surface 114*b* that can be arranged (e.g., parallel to one another) to define one or more ion channels there between. The first surface 114*a* and the second surface 114*b* can include a plurality of electrodes 116, 118*a-f*, 120*a-e*, 122*a-h* (shown in FIG. 3), which can be arranged as arrays of electrodes on the surfaces facing the ion channel. The electrodes 116, 118*a*-118*f*, 120*a-e*, 122*a-h* on the first surface 114*a* and second surface 114*b* can be electrically coupled to the first controller 106 and receive voltage (or current) signals or waveforms therefrom. In some implementations, the first surface 114*a* and second surface 114*b* can include a backplane that includes multiple conductive channels, e.g., traces, that allow for electrical connection between the controller 106 and the electrodes 116, 118*a-f*, 120*a-e*, 122*a-h* on the first surface 114*a* and second surface 114*b*. In some implementations, the number of conductive channels can be fewer than the number of electrodes 116, 118*a-f*, 120*a-e*, 122*a-h*. In other words, multiple electrodes 116, 118*a-f*, 120*a-e*, 122*a-h* can be connected to a single electrical channel. As a result, a given voltage (or current) signal can be transmitted to multiple electrodes 116, 118*a-f*, 120*a-e*, 122*a-h* simultaneously. Alternatively, some or all of the electrodes 116, 118*a-f*, 120*a-e*, 122*a-h* can be provided with an independent trace, or groups of electrodes 116, 118*a-f*, 120*a-e*, 122*a-h* can be connected via a single trace. In such instances, individual electrodes 116, 118*a-f*, 120*a-e*, 122*a-h* or groups of electrodes 116, 118*a-f*, 120*a-e*, 122*a-h* can be independently controlled to perform certain functionality, e.g., receive a high amplitude DC voltage signal and generate a gating DC electric field that prevents ions from passing. Based on the received voltage (or current) signals, the electrodes 116, 118*a-f*, 120*a-e*, 122*a-h* can generate one or more potentials (e.g., a superposition of various potentials) that can confine, drive, separate, gate, retain, and/or accumulate ions along a propagation axis (e.g., z-axis).

Figure 3:
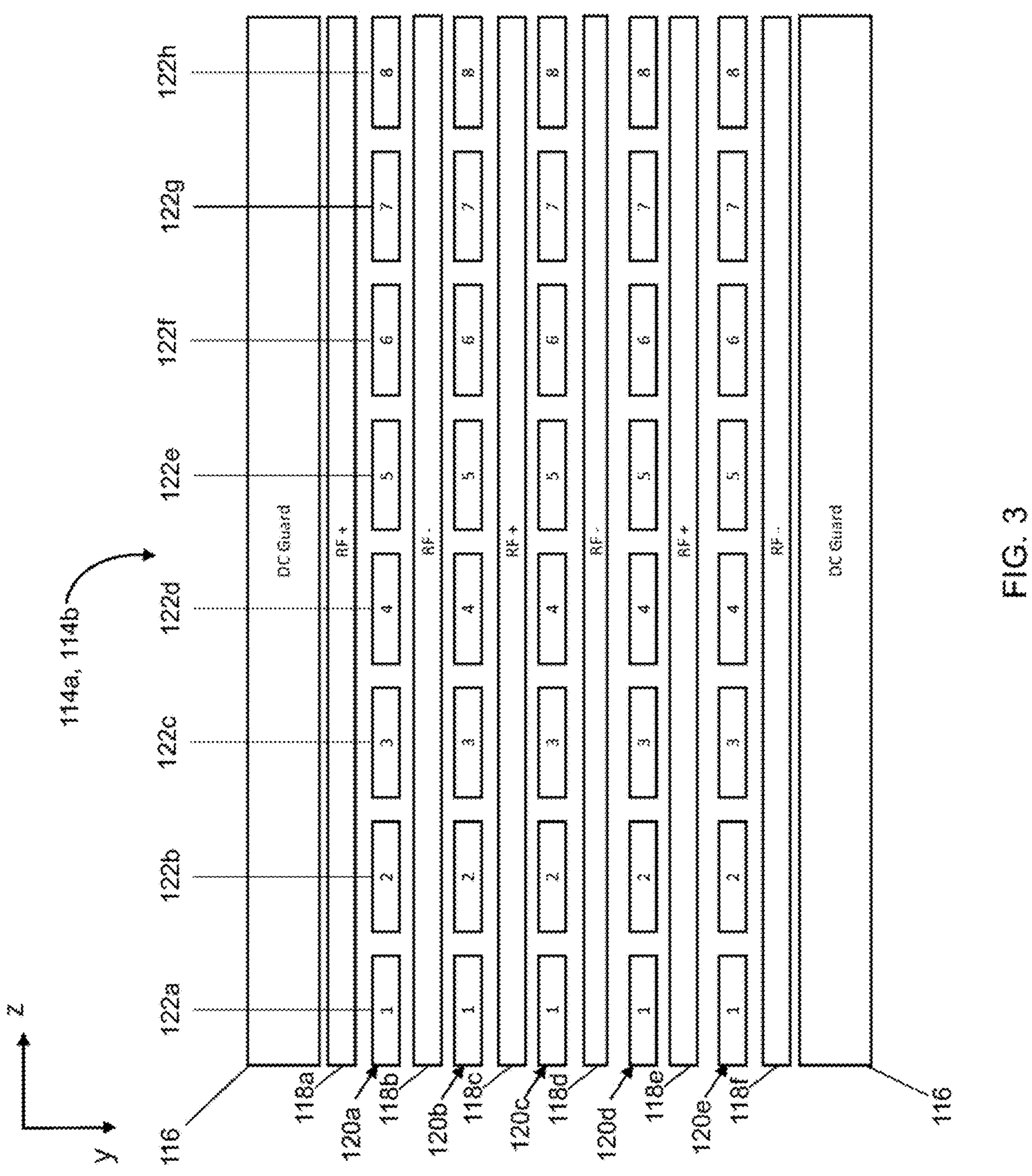
FIG. 3 is a schematic diagram of a first/second surface of the SLIM transfer device of FIG. 2 illustrating exemplary electrode placement.

FIG. 3 is a schematic diagram of the first and second surfaces 114*a*, 114*b* of the SLIM device 104 illustrating a first exemplary arrangement of electrodes 116, 118*a-f*, 120*a-e*, 122*a-h* thereon. The first and second surfaces 114*a*, 114*b* can be substantially mirror images relative to a parallel plane, and thus it should be understood that the description of the first surface 114*a* applies equally to the second surface 114*b*, thus the second surface 114*b* can include electrodes with similar electrode arrangement to the first surface 114*a*.

The first surface 114*a* includes guard electrodes 116, a plurality of continuous electrodes 118*a-f*, and a plurality of segmented electrode arrays 120*a-e*. Each of the plurality of continuous electrodes 118*a-f* can receive voltage (or current) signals, or can be connected to ground potential, and can generate a pseudopotential that can prevent or inhibit ions from approaching the first surface 114*a*. The plurality of continuous electrodes 118*a-f* can be rectangular in shape with the longer edge of the rectangle arranged along the direction of propagation of ions undergoing mobility separation, e.g., along the propagation axis which is parallel to the z-axis shown in FIG. 3. The plurality of continuous electrodes 118*a-f* can be separated from each other along a lateral direction, e.g., along the y-axis, which can be perpendicular to the direction of propagation, e.g., the z-axis.

Each of the plurality of segmented electrode arrays 120*a-e* can be placed between two continuous electrodes 118*a-f*, and includes a plurality of individual electrodes 122*a-h*, e.g., eight electrodes, sixteen electrodes, twenty-four electrodes, etc., that are arranged along (parallel to) the direction of propagation, e.g., along the z-axis. It should be understood that each segmented electrode array 120*a-e* can include more or less than eight electrodes, but should include at least three electrodes. Additionally, the individual electrodes 122*a-h* can be separated into individual groups that receive specific signals from the controller 106, discussed in greater detail below. The plurality of segmented electrode arrays 120*a-e* can receive a traveling wave voltage signal and generate a drive potential that can drive ions along the propagation axis or a DC voltage signal that can trap ions, which is discussed in greater detail below. That is, the first and second surfaces 114*a*, 114*b*, and the electrode arrangements thereof, can be implemented for different purposes (e.g., for MS-only mode or IM mode), and thus have different functionalities, based upon the voltage settings applied to the continuous electrodes 118*a-f*, the segmented electrode arrays 120*a-e*, and the plurality of individual electrodes 122*a-h*.

The plurality of continuous electrodes 118*a-f* and the plurality of segmented electrode arrays 120*a-e* can be arranged in alternating fashion on the first surface 114*a* between the DC guard electrodes 116. The segmented electrodes 120*a-e* can be traveling wave (TW) electrodes such that each of the individual electrodes 122*a-h* of each segmented electrode array 120*a-e* receives a voltage signal that is simultaneously applied to all individual electrodes 122*a-h*, but phase shifted between adjacent electrodes 122*a-h* along the z-axis. However, the same individual electrodes, e.g., the first individual electrodes 122*a*, of the segmented electrode arrays 120*a-e* receive the same voltage signal without phase shifting.

The SLIM device 104, along with the electrodes 116, 118*a-f*, 120*a-e*, 122*a-h* thereof, can be constructed and operate substantially in accordance with U.S. Pat. No. 8,835,839 entitled "Method and Apparatus for Ion Mobility Separations Utilizing Alternating Current Waveform," U.S. Pat. No. 10,317,364 entitled "Ion Manipulation Device," and U.S. patent application Ser. No. 17/327,159 entitled "Methods and Apparatus for Trapping and Accumulation of Ions" and published on Nov. 25, 2021, as U.S. Patent App. Pub. No. 2021/0364467, all of which are incorporated herein by reference in their entireties. Notwithstanding the foregoing, it should be understood that the voltage signal applied to the electrodes 116, 118*a-f*, 120*a-e*, 122*a-h* can be one or more of a sinusoidal waveform (e.g., an AC voltage waveform), a rectangular waveform, a DC square waveform, a sawtooth waveform, a triangular waveform, a biased sinusoidal waveform, a pulsed current waveform, a high amplitude DC gating voltage signal, etc.

Figure 4:
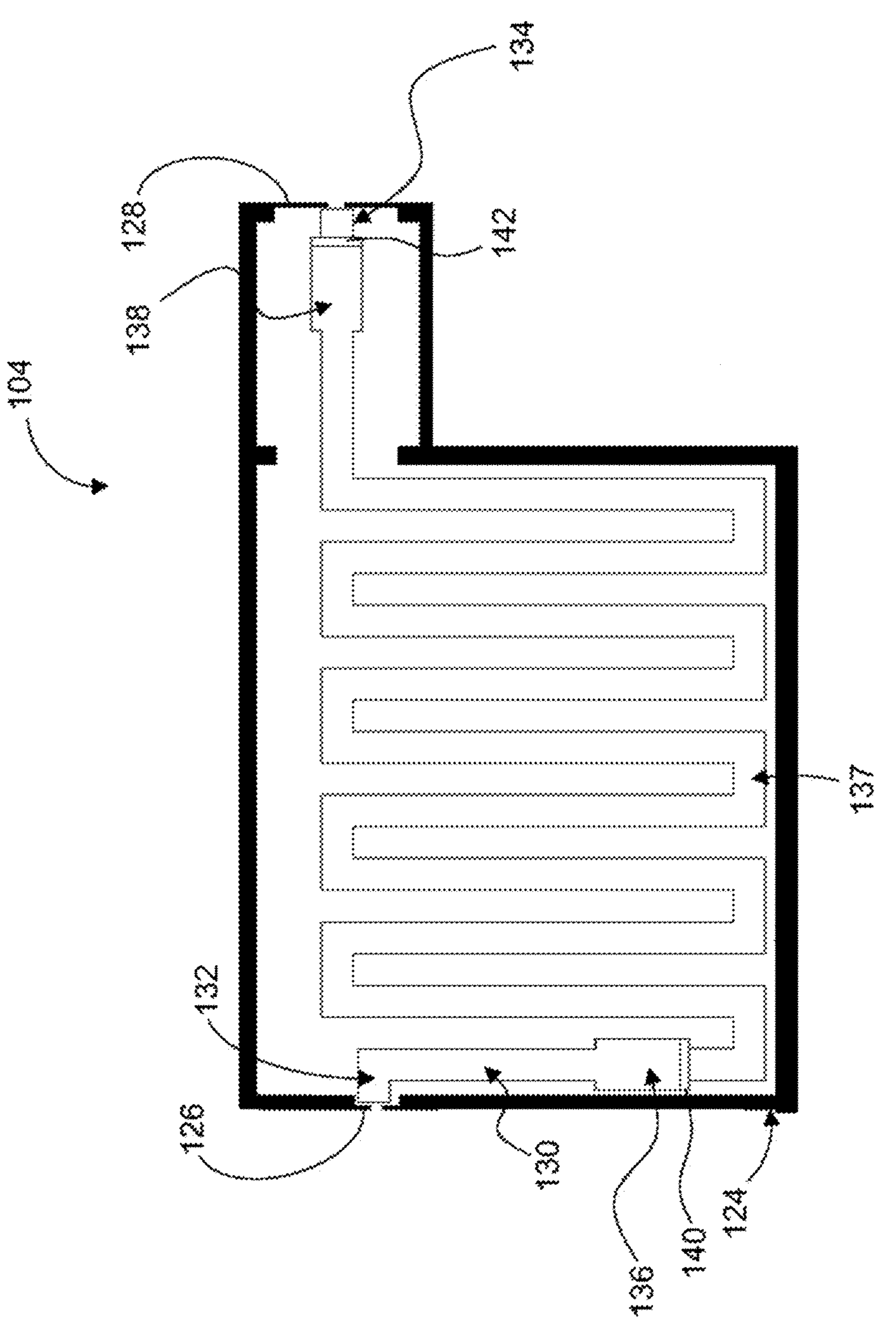
FIG. 4 is a diagrammatic view of the SLIM transfer device of FIG. 1.

FIG. 4 is a diagrammatic view of the SLIM transfer device 104 of the IMS system 100 of FIG. 1. The SLIM transfer device 104 can include a housing 124, an inlet orifice plate 126, an outlet orifice plate 128, and an ion manipulation path 130 (e.g., a SLIM path), which can be formed between the first and second surfaces 114*a, b* discussed in connection with FIG. 2. The inlet orifice plate 126 can be positioned adjacent an inlet region 132 of the ion manipulation path 130, and between the inlet region 132 and an ion funnel or other component configured to receive ions from the ionization source 102 and transfer the received ions to the SLIM transfer device 104. The outlet orifice plate 128 is positioned adjacent an outlet region 134 of the ion manipulation path 130 between the outlet region 134 and a downstream device, such as the ion optics 202 or an alternative component, e.g., a quadrupole, beam guide, etc., positioned between the SLIM transfer device 104 and the ion optics 202. The ion manipulation path 130 extends from the inlet region 132 to the outlet region 134 and can be serpentine in shape to maximize the length thereof. The SLIM transfer device 104 can also include a first onboard accumulation region 136, e.g., a pre-IMS accumulation region, a second onboard accumulation region 138, e.g., an ion guide accumulation region, and a separation or transfer path 137 extending there between.

The pre-IMS accumulation region 136 includes a pre-IMS accumulation region gate 140 and the ion guide accumulation region 138 includes an ion guide accumulation region gate 142. The gates 140, 142 can be formed from a group, e.g., row or column, of electrodes. In particular, the gates 140, 142 can be made up of one or more gate electrodes, which can be, for example, a single row or column of electrodes as shown in FIG. 3. For example, the eighth electrode 122*h* from each segmented electrode array 120*a-e* can form an electrode gate and have a signal applied thereto to trap or prevent the ions from continued propagation through the ion manipulation path 130. More specifically, the gates 140, 142 can receive a high DC gating voltage signal from the first controller 106 and in turn generate a high DC gating electric field (V/m) to trap ions within the accumulation regions 136, 138. Alternatively, the electrodes of the accumulation regions 136, 138 can receive a low amplitude DC bias, e.g., a DC bias that is lower in amplitude compared to the DC bias applied to other adjacent regions of the SLIM device 104, that creates a potential well in which ions accumulate. The accumulation regions 136, 138 and the gates 140, 142 can function substantially in accordance with the disclosure of U.S. patent application Ser. No. 17/327,159 entitled "Methods and Apparatus for Trapping and Accumulation of Ions" and published on Nov. 25, 2021, as U.S. Patent App. Pub. No. 2021/0364467, which is incorporated herein by reference in its entirety.

The pre-IMS accumulation region 136 can be generally utilized when the SLIM device 104 is operated in IM mode. As such, once a desired number of ions are accumulated in the pre-IMS accumulation region 136, the high DC voltage signal can be removed from the pre-IMS accumulation region gate 140 and a traveling wave signal can be applied that is coordinated with the traveling wave signal applied to the other individual electrodes 122*a-h* within the pre-IMS accumulation region 136. Once the high DC voltage signal is removed and the traveling wave signal is applied, the ions will be urged into the separation path 137 where they can undergo ion mobility separation.

The ion guide accumulation region 138 can be utilized when the SLIM device 104 is operated in MS-only mode or IM mode and it is desired to synchronize the release of ions from the SLIM device 104 with the pre-MS ion gating element 204 of the ion optics 202. Accordingly, the ion guide accumulation region gate 142 thereof can be synchronized with the pre-MS ion gating element 204 such that it receives a high DC voltage signal when the pre-MS ion gating element 204 is closed (e.g., not allowing ions to pass), and receives a TW voltage signal, e.g., the high DC voltage signal is removed, when the pre-MS ion gating element 204 is open (e.g., allowing ions to pass). Accordingly, the ion guide accumulation region 138 can be configured to accumulate ions when the pre-MS ion gating element 204 is closed and release ions, or permit ions to pass there through, when the pre-MS ion gating element 204 is open. In doing so, the SLIM device 104 is capable of achieving a duty cycle that approaches 100%, e.g., nearly all ions traversing the SLIM device 104 are provided to the mass spectrometer 200.

The advantage of utilizing a SLIM device 104 to accumulate ions in accordance with the present disclosure is two-fold. First, SLIM devices 104 are readily expandable to increase the number of ions that can be accumulated. Specifically, the amount of continuous electrodes 118*a-f* and segmented electrode arrays 120*a-e* can be expanded to provide a wider and larger area for the accumulation regions 136, 138. This larger area increases the charge capacity of the accumulation regions 136, 138, thus permitting the accumulation regions 136, 138 to store large populations of ions while waiting for the mass spectrometer/analyzer 200 to be ready to receive another packet of ions and for the pre-MS ion gating element 204 to open allowing ions to pass to the mass spectrometer/analyzer 200. This functionality provides for an increased duty cycle when compared to devices that cannot store large populations of ions, thus making SLIM devices particularly useful for implementing with the present disclosure. These aspects of SLIM devices 104, e.g., the expandability to increase the ion storage capacity of accumulation regions and the benefits thereof, are discussed in detail in U.S. patent application Ser. No. 17/327,159 entitled "Methods and Apparatus for Trapping and Accumulation of Ions" and published on Nov. 25, 2021, as U.S. Patent App. Pub. No. 2021/0364467, and "Greatly Increasing Trapped Ion Populations for Mobility Separations Using Traveling Waves in Structures for Lossless Ion Manipulations," Deng, et al., Analytical Chemistry 2016 88(2), 10143-10150, which are incorporated herein by reference. Second, the SLIM device 104 utilizes a traveling wave to accumulate ions in contrast to other devices that utilize pulsed or varying DC potentials. As such, the SLIM device 104 can continuously accept new incoming ions with a near 100% duty cycle and subsequently release the accumulated ions at the required frequency for the downstream mass spectrometer/analyzer 200. In contrast, other devices might apply a constant DC field across the accumulation regions 136, 138 to attempt to achieve the foregoing results; however, doing so would necessitate all components upstream of the mass spectrometer/analyzer 200 be floated at the increased DC voltage, which increases the complexity of the overall system.

The ion optics 202, including the pre-MS ion gating element 204, and mass spectrometer/analyzer 200 are positioned downstream of the SLIM transfer device 104 and configured to receive ions that exit from the SLIM transfer device 104. The ion optics 202 can be configured to receive ions directly from the SLIM transfer device 104 or can be configured to receive ions from one or more components positioned between the SLIM transfer device 104 and the ion optics 202. For example, one or more ion guides (e.g., advanced active beam guides, multipole ion guides etc.), mass filters (e.g., quadrupoles, octupoles, hexapoles, etc.), orifice plates, etc., can be positioned between the exit of the SLIM transfer device 104 and the ion optics 202 such that ions exiting the SLIM transfer device 104 must pass there through prior to reaching the ion optics 202. Additionally, as would be appreciated by those of skill in the art, such additional components can form a part of the transfer ion optics 202. As mentioned, the ion optics 202 includes a pre-MS ion gating element 204 that controls whether ions are permitted to pass to the mass spectrometer/analyzer 200. The pre-MS ion gating element 204 can be, for example, a split lens that opens and closes to control the transfer or injection of ions into the mass spectrometer/analyzer 200. The mass spectrometer/analyzer 200 can be, for example, an orbitrap mass analyzer, a quadrupole ion trap, a linear ion trap, a toroidal ion trap, or any other trap-based mass analyzer as is known in the art. It is also contemplated by the present disclosure that one or more components, including ion guides (e.g., a C-trap) and/or orifice plates, can be positioned between the ion optics 202 and the mass spectrometer/analyzer 200, and which can inject ions into the mass spectrometer/analyzer 200.

As previously noted, the pre-MS ion gating element 204 can control the transfer of ions to the mass spectrometer/analyzer 200. In this regard, the pre-MS ion gating element 204 can be "opened" to permit ions to enter the mass spectrometer/analyzer 200, or can be "closed" to prevent ions from entering the mass spectrometer/analyzer 200. However, when the pre-MS ion gating element 204 is closed, all ions provided thereto are eliminated and lost. Accordingly, the SLIM transfer device 104 of the present disclosure can be synchronized or coordinated with the pre-MS ion gating element 204 so that it does not provide ions to the pre-MS ion gating element 204 at all times, which would result in the loss of ions when the pre-MS ion gating element 204 are closed, but instead provides ions to the pre-MS ion gating element 204 only when the pre-MS ion gating element 204 is open and accumulates ions in the ion guide accumulation region 138 when the pre-MS ion gating element 204 is closed. More specifically, the SLIM transfer device 104 and the pre-MS ion gating element 204 are synchronized such that when the pre-MS ion gating element 204 is open, the ion guide accumulation region gate 142 receives a TW voltage signal and permits ions to pass, and when the pre-MS ion gating element 204 is closed, the ion guide accumulation region gate 142 receives a gating signal, e.g., a high magnitude DC voltage signal, that causes the gate electrodes to generate a potential barrier that prevents ions from exiting the SLIM transfer device 104 and causes the ions to accumulate in the ion guide accumulation region 138. Accordingly, ions are prevented from exiting the SLIM transfer device 104 and being neutralized by the pre-MS ion gating element 204 when the pre-MS ion gating element 204 is closed.

Figure 5:
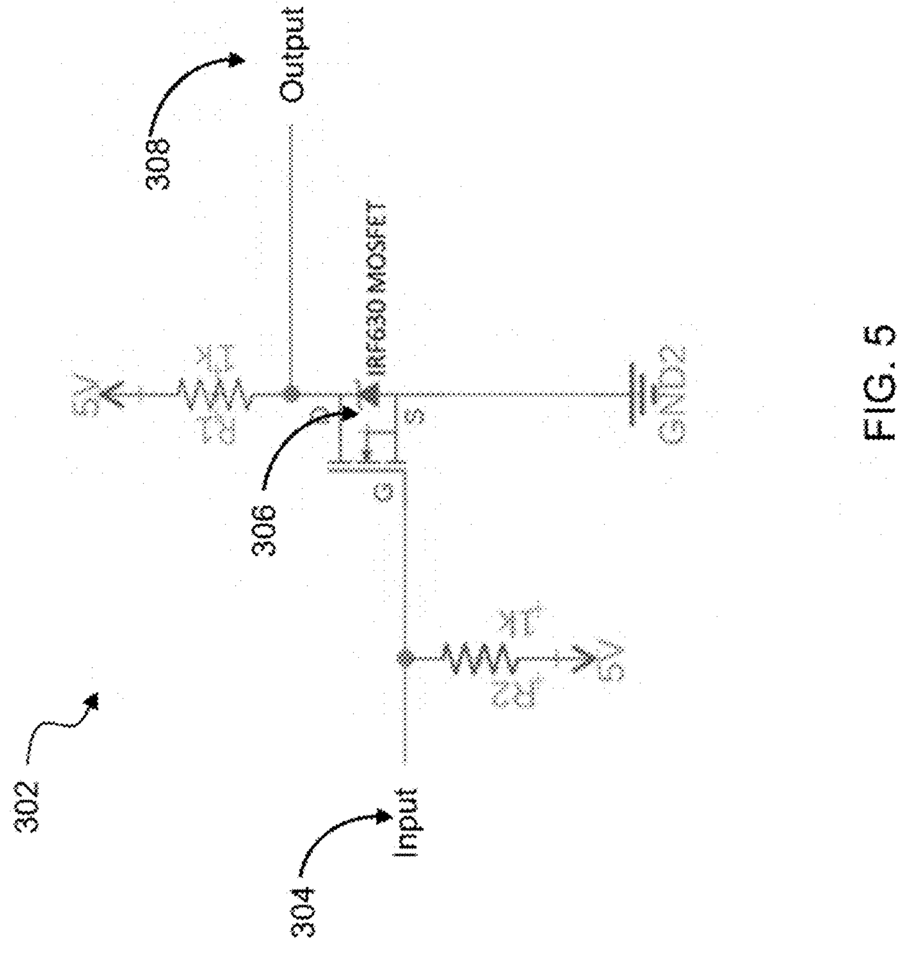
FIG. 5 is a diagrammatic view of an exemplary logic circuit of the present disclosure.

The foregoing synchronization can be achieved by having the second controller 300 communicate with the first controller 106, e.g., the second controller 300 can provide the pre-MS ion gating element 204 signal, a signal representative of the pre-MS ion gating element 204 signal, or a timing signal, to the first controller 106 which can in turn control the ion guide accumulation region gate 142 based on the received signal, or by utilizing a logic circuit, such as the exemplary logic circuit 302 illustrated in FIG. 5. The logic circuit 302 can be a logic inversion circuit that is in electrical communication with the pre-MS ion gating element 204 and the IMS system 100.

As shown in FIG. 5, the logic circuit 302 can be built as a logic inversion circuit that includes an input terminal 304, a MOSFET (metal-oxide semiconductor field-effect transistor) transistor 306, e.g., an IRF630 MOSFET, a first resistor R1, a second resistor R2, and an output terminal 308. A first terminal of the MOSFET transistor 306 is connected to a first end of the second resistor R2 and the input terminal 304, which receives an input signal that is indicative of the state of the ion optics 202, e.g., whether the ion optics 202 is open or closed. A second terminal of the MOSFET transistor 306 is connected to a first end of the first resistor R1 and the output terminal 308 and transmits an output signal to a breakout board switch. A third terminal of the MOSFET transistor 306 is connected to the ground. A second end of the second resistor R2 is connected to a first 5V power supply, and a second end of the first resistor R1 is connected to a second 5V power supply.

In one embodiment, the MOSFET transistor 306 can be an N-channel MOSFET, and the first power supply and the second power supply can provide a 5V signal. The N-channel MOSFET 306 can be used as a level triggered logic to invert the logic of the 5V signal. Therefore, when the logic level of the input signal from the ion optics 202 is inverted by the ion optics logic circuit 300, the ion guide accumulation region gate 142 of the SLIM transfer device 104 and opening of the ion optics 202 can be synchronized.

Conventionally, the pre-MS ion gating element 204, e.g. the split lens, opens and closes to allow ions from the SLIM transfer device 104 to enter the mass spectrometer 200, e.g., a C-trap thereof, and when the pre-MS ion gating element 204 is closed, all of the ions provided thereto are eliminated. To improve the ion utilization efficiency and sensitivity, in the present disclosure, when the pre-MS ion gating element 204 is closed, a signal indicating such is transmitted to the logic circuit 302, which, in response to receiving this signal, generates a synchronization signal that is transmitted to the first controller 106 The first controller 106, in response to receiving the synchronization signal, switches the TW voltage signal applied to the segmented electrodes 122*a-h* forming the ion guide accumulation region gate 142 to the high amplitude blocking DC voltage signal. As previously described, the high amplitude blocking DC voltage signal applied to the ion guide accumulation region gate 142 electrodes is of sufficient magnitude to cause the ion guide accumulation region gate 142 electrodes to generate a potential wall that prevents ions from continued propagation through the ion manipulation path 130, thus causing ions to accumulate in the ion guide accumulation region 138 before the exit of the SLIM transfer device 104.

Alternatively, when the pre-MS ion gating element 204 is open, a signal indicating such is transmitted to the logic circuit 302. The logic circuit 302, in response to receiving this signal, will generate and transmit a synchronization signal to the first controller 106. The first controller 106, in response to receiving the synchronization signal, will provide the TW voltage signal to the segmented electrodes 122*a-h* forming the ion guide accumulation region gate 142 in the SLIM transfer device 104, such that the ions will be transferred out from the ion guide accumulation region 138, the SLIM transfer device 104, and to the pre-MS ion gating element 204 and mass spectrometer/analyzer 200.

Accordingly, the ion guide accumulation region 138, in particular, the ion guide accumulation region gate 142 thereof, can be synchronized with the pre-MS ion gating element 204 to store and accumulate ions when the pre-MS ion gating element 204 is closed and to release ions when the pre-MS ion gating element 204 is open, resulting in a reduction of ion loss when transferring ions from SLIM transfer device 104 to the mass spectrometer/analyzer 200.

Additionally, a time delay can be introduced to the signals provided to the SLIM transfer device 104, e.g., by the first controller 106, so that the application of the high amplitude blocking DC voltage signal to the ion guide accumulation region gate 142, or application of the TW voltage signal, is delayed or adjusted. This time delay can be introduced to account for the transit time of ions, e.g., through the transfer path 137 of the SLIM device 104.

The foregoing accumulation and non-accumulation aspects of the present disclosure were evaluated in a first experiment utilizing a SLIM device 104 having a 13 meter separation/transfer path 137, a Thermo Scientific™ Orbitrap Exploris™ 480 system 200, and a split lens 202. The first experiment was conducted with the SLIM device 104 operating in both MS-only and ion mobility (IM) modes over a m/z range of 300 to 3000 at different MS resolutions (i.e., transient lengths) with the maximum ion injection time being set equal to the transient length of the MS scan. MS-only mode means that ions are transmitted through the ion path 132 without undergoing ion mobility separation, and IM mode means that ions are first accumulated in the first accumulation region 136, subsequently released, and separated based on ion mobility. The experiment was performed as follows:

Step 1: Connect exit optics of the SLIM device 104 to the Modular Intelligent Power Sources (MIPS) with a 5V supply to allow ions to pass the ion guide accumulation region gate 142 without blocking, e.g., ions are not accumulated in the ion guide accumulation region 138.

Step 2: Release ions from the pre-IMS accumulation region 136 to begin IM-MS separation with a 2.5 second frame length (preventing rollover) and collect data for 15 IM runs.

Step 3: After the 15 IM runs (scans), set the pre-IMS accumulation region gate 140 to a default open position such that the SLIM device 104 is operated in MS-only mode and ions are not accumulated in the pre-IMS accumulation region 136.

Step 4: Unplug the exit gate from the MIPS 5V supply and swap to the synchronized signal from the split lens 202, e.g., utilizing a breakout board, which results in a dead period being observed.

Step 5: Repeat Step 2 and Step 3 using the ion guide accumulation region 138, ion guide accumulation region gate 142, and split lens 202 synchronization signal.

Figure 6:
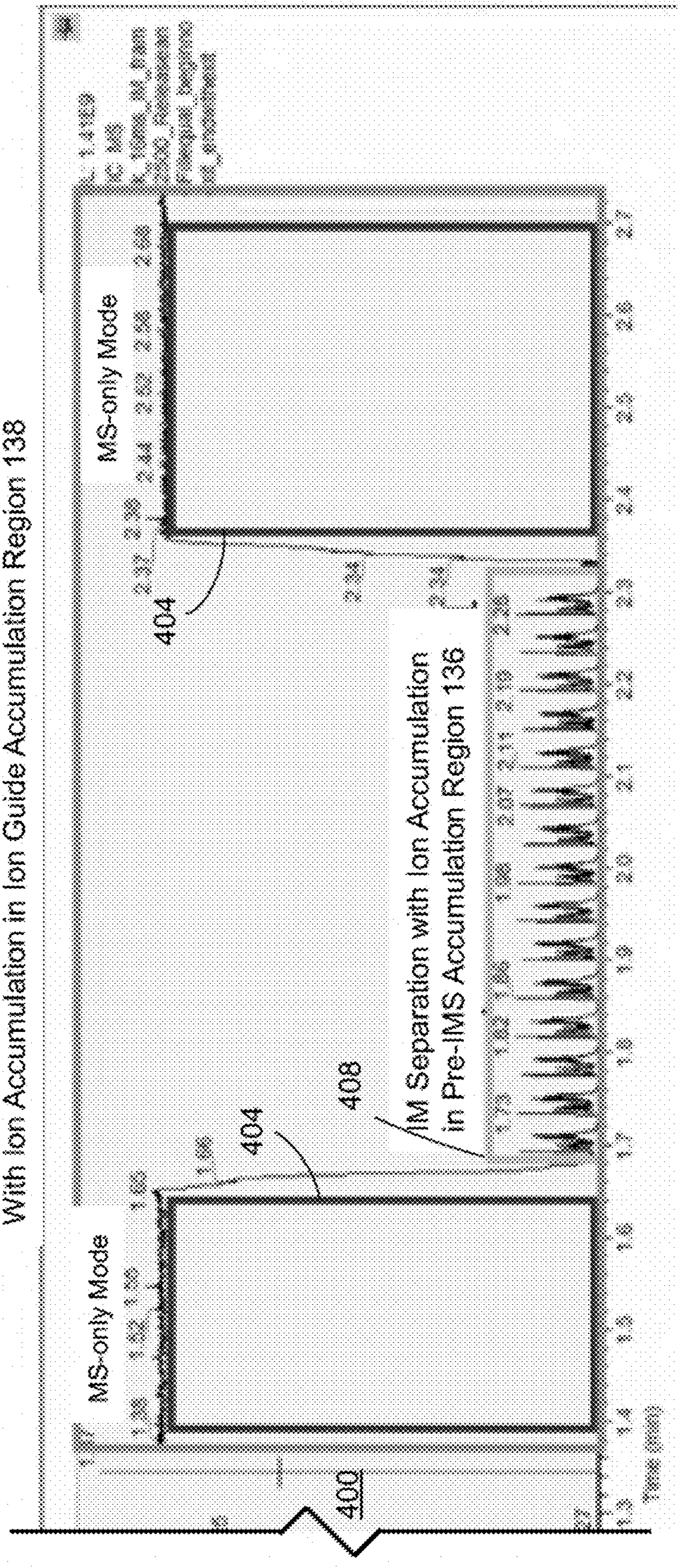
FIG. 6 illustrates experimental data for a first experiment evaluating the system of the present disclosure including a plot of relative abundance versus time.
Figure 7:
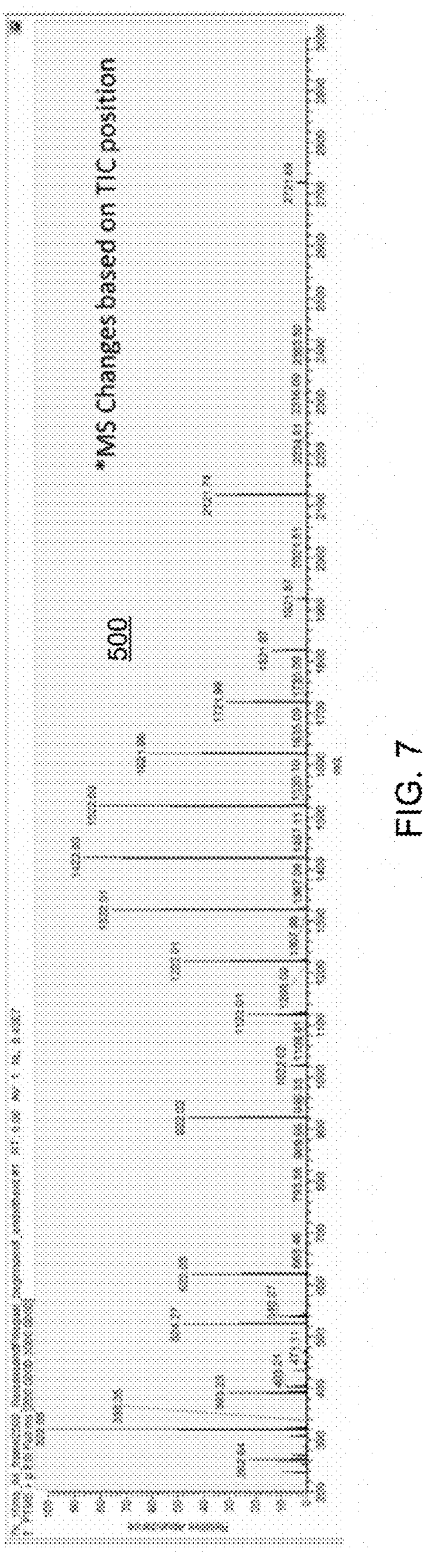
FIG. 7 is a plot of relative abundance versus m/z for the first experiment of FIG. 6.

FIGS. 6 and 7 show exemplary IMS-MS data for the above-described experiment utilizing stock FlexMix obtained on a 13 m SLIM-Exploris™ 480 IM-MS system in both MS-only and IM modes of operation with and without accumulation of ions in the ion guide accumulation region 138. In particular, FIG. 6 is a plot 400 of relative abundance versus time (min) over the course of the experiment, with boxes 402 highlighting the relative abundance when the SLIM device 104 is operated in MS-only mode without accumulating ions in the ion guide accumulation region 138, boxes 404 highlighting the relative abundance when the SLIM device 104 is operated in MS-only mode with accumulating ions in the ion guide accumulation region 138 and timing the release of the accumulated ions with the split lens 204, box 406 highlighting the relative abundance when the SLIM device 104 is operated in IM separation mode utilizing the pre-IMS accumulation region 136 to accumulate ions and without accumulating ions in the ion guide accumulation region 138, and box 408 highlighting the relative abundance when the SLIM device 104 is operated in IM separation mode utilizing the pre-IMS accumulation region 136 to accumulate ions and with accumulating ions in the ion guide accumulation region 138 and timing the release of the accumulated ions with the split lens 204. As can be seen in FIG. 6, the relative abundance increased when ions were accumulated in the ion guide accumulation region 138 prior to being released to the split lens 204. FIG. 7 is a plot 500 of relative abundance versus m/z for the foregoing experiment.

Furthermore, six (6) seconds of MS-only mode operation and five (5) IM separations were integrated to compare the peak areas with the ion guide accumulation region 138 of the SLIM device 104 accumulating ions and not accumulating ions. Additionally, the number of ions injected into the mass spectrometer 200, e.g., into the C-Trap of the mass spectrometer 200, was determined by equation (1) below:

$$\text{\# of Ions Injected} = \frac{\text{Peak Area}}{\text{time (ms)}} \times \text{Max Injection Time (ms)} \tag{1}$$

Figures 8A, 8B:
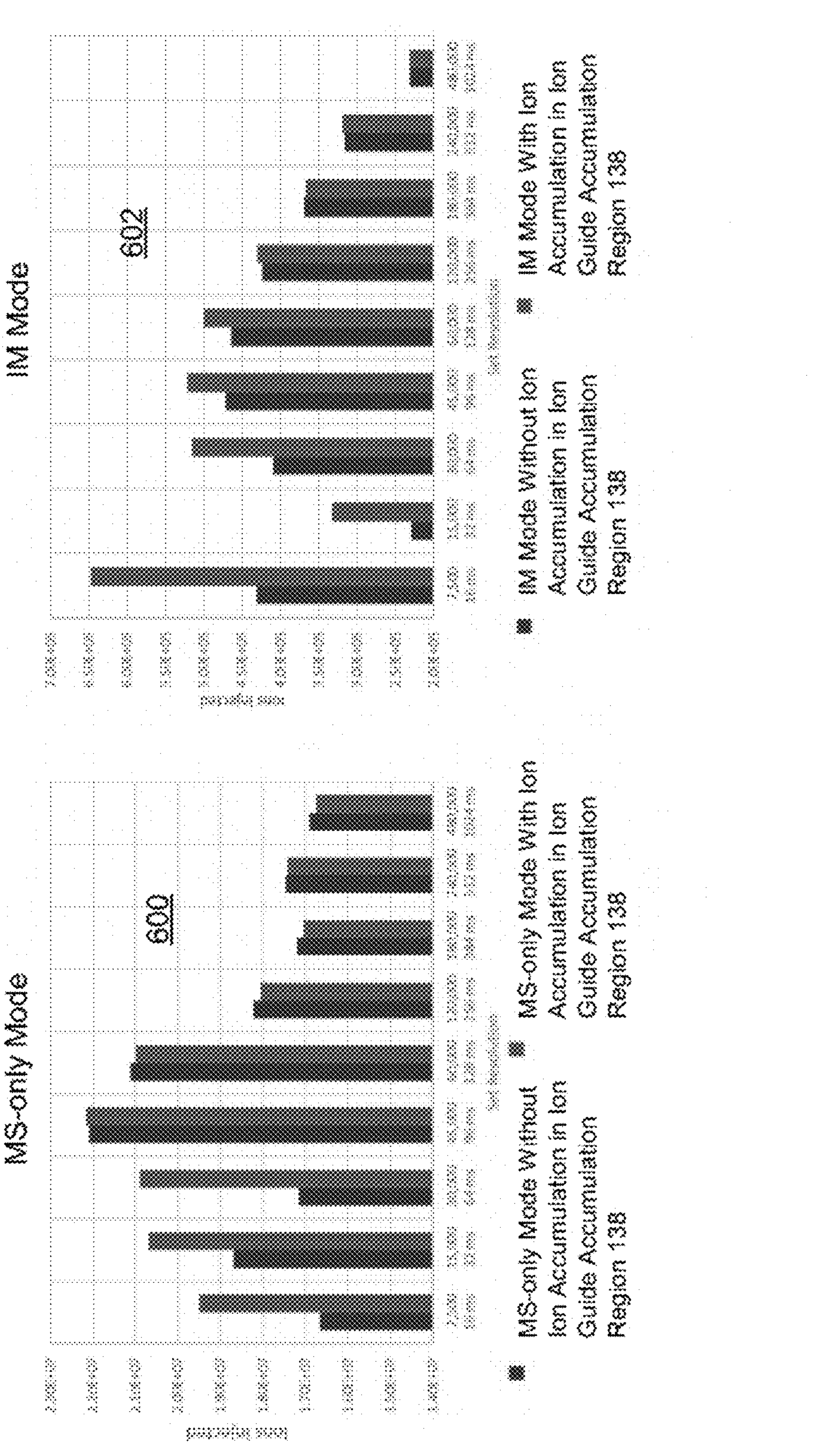
FIG. 8A is a plot of number of ions injected versus set resolution in accordance with the first experiment of FIG. 6 for six (6) seconds of MS-only mode of operation that were integrated showing results for the SLIM device both accumulating ions prior to release and not accumulating ions.
FIG. 8B is a plot of peak area versus set resolution in accordance with the first experiment of FIG. 6 for five (5) ion mobility separations that were integrated showing results for the SLIM device both accumulating ions prior to release and not accumulating ions.

The number of ions injected was then plotted as a function of the set resolution, as shown in FIGS. 8A and 8B. Specifically, FIG. 8A is a plot 600 of number of ions injected versus set resolution for the six (6) seconds of MS-only mode operation that were integrated showing results for (1) the SLIM device 104 accumulating ions in the ion guide accumulation region 138 and timing the release of the accumulated ions with the split lens 204 (lighter shading, right-side column of each column pair) and (2) the SLIM device 104 not accumulating ions in the ion guide accumulation region 138 (darker shading, left-side column of each column pair), and FIG. 8B is a plot 602 of number of ions injected versus set resolution for the five (5) IM separations that were integrated showing results for (1) the SLIM device 104 accumulating ions in the ion guide accumulation region 138 and timing the release of the accumulated ions with the split lens 204 (lighter shading, right-side column of each column pair) and (2) the SLIM device 104 not accumulating ions in the ion guide accumulation region 138 (darker shading, left-side column of each column pair). As can be seen from FIGS. 8A and 8B, the number of ions injected is generally greater when ions are accumulated in the ion guide accumulation region 138 prior to exiting the SLIM device 104. That is, the foregoing illustrates that the split lens 204 eliminates less ions when the ion guide accumulation region 138 is implemented.

Figure 9:
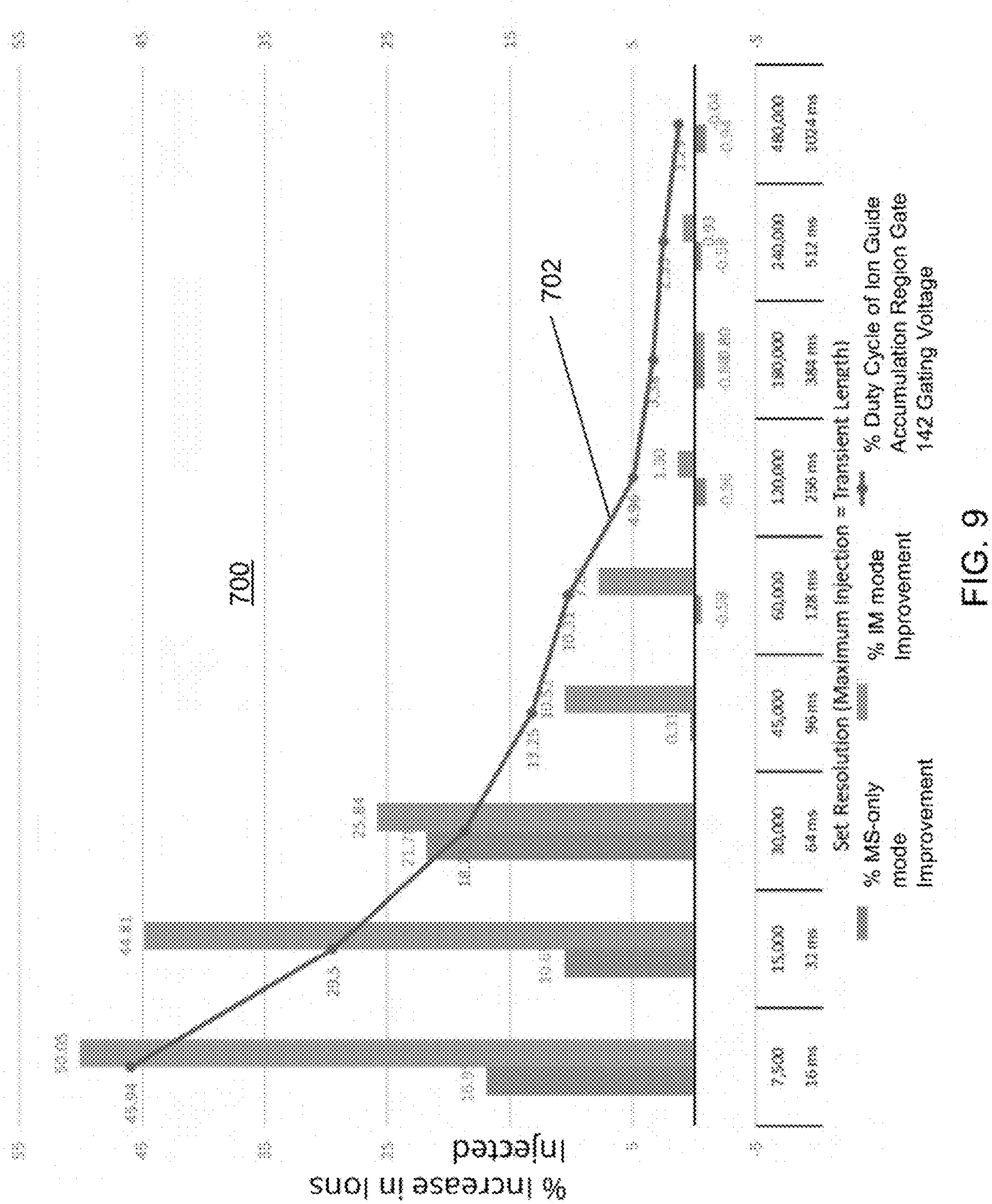
FIG. 9 is a plot illustrating percent increase in the integrated peak area for the plots of FIGS. 8A and 8B.

FIG. 9 is a plot 700 illustrating percent increase in the number of ions injected for both MS-only mode and IM mode with and without ion accumulation in the ion guide accumulation region 138 prior to the ions exiting the SLIM device 104. Percent increase is defined by equation (2) below:

$$\%\ \text{Increase} = \frac{\text{Ions Injected}_{\text{With Ion Accumulation}} - \text{Ions Injected}_{\text{Without Ion Accumulation}}}{|\text{Ions Injected}_{\text{Without Ion Accumulation}}|} \times 100 \tag{2}$$

The percent increase in the number of ions injected into the mass spectrometer 200, e.g., the C-Trap of the mass spectrometer 200, for MS-only mode is illustrated in plot 700 by the darker left-hand side column of each column pair, while the percent increase in the number of ions injected for IM mode is illustrated in plot 700 by the lighter right-hand side column of each column pair. Line 702 represents the duty cycle of the ion guide accumulation region gate 142 gating voltage defined by the percent of a given period where the split lens 204 is closed and the ion guide accumulation region gate 142 is receiving a gating voltage (e.g., the ion guide accumulation region 138 is storing ions instead of the ions being lost). As can be seen in FIG. 9, a comparable or greater number of ions injected was achieved in both MS-only and IM modes with ion accumulation in the ion guide accumulation region 138 for short transient modes.

A second experiment was performed in substantially similar fashion to the first experiment described above, but with a fixed MS resolution of 45,000 and 96 ms transient length, and with a maximum injection time (MIJ) that was varied from 1 ms to 150 ms.

Figures 10A, 10B:
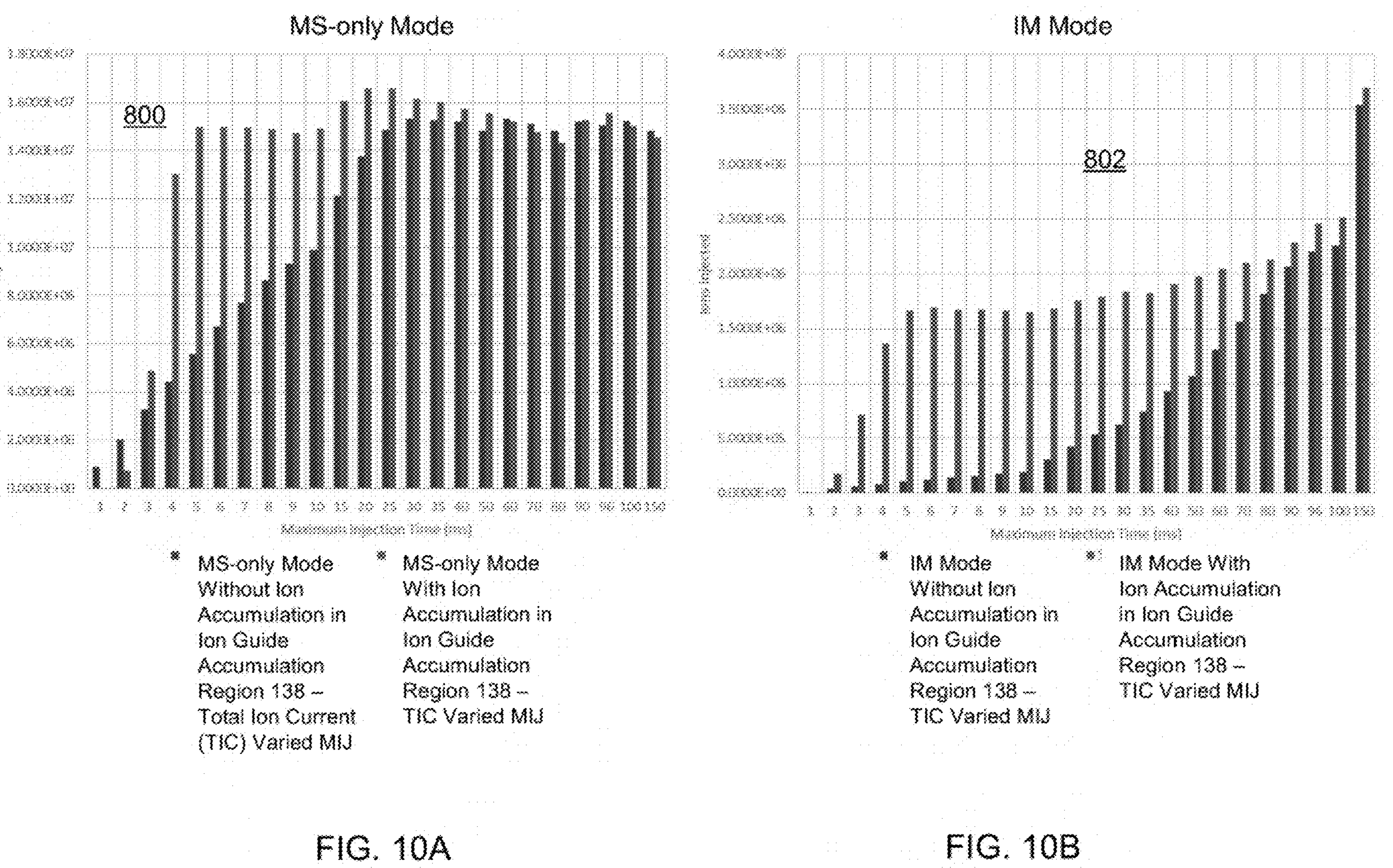
FIG. 10A is a plot of number of ions injected versus set resolution in accordance with a second experiment for six (6) seconds of MS-only mode of operation that were integrated showing results for the SLIM device both accumulating ions prior to release and not accumulating ions.
FIG. 10B is a plot of number of ions injected versus set resolution in accordance with the second experiment for five (5) ion mobility separations that were integrated showing results for the SLIM device both accumulating ions prior to release and not accumulating ions.

Furthermore, for the second experiment, six (6) seconds of MS-only mode operation and five (5) IM separations were integrated to compare the peak areas with the ion guide accumulation region 138 of the SLIM device 104 accumulating ions and not accumulating ions. Additionally, the number of ions injected into the mass spectrometer 200, e.g., into the C-Trap of the mass spectrometer 200, was determined by equation (1). The number of ions injected was then plotted as a function of the set resolution, as shown in FIGS. 10A and 10B. Specifically, FIG. 10A is a plot 800 of number of ions injected versus set resolution for the six (6) seconds of MS-only mode operation that were integrated showing results for (1) the SLIM device 104 accumulating ions in the ion guide accumulation region 138 and timing the release of the accumulated ions with the split lens 204 (lighter shading, right-side column of each column pair) and (2) the SLIM device 104 not accumulating ions in the ion guide accumulation region 138 (darker shading, left-side column of each column pair), and FIG. 10B is a plot 802 of number of ions injected versus set resolution for the five (5) IM separations that were integrated showing results for (1) the SLIM device 104 accumulating ions in the ion guide accumulation region 138 and timing the release of the accumulated ions with the split lens 204 (lighter shading, right-side columns of each column pair) and (2) the SLIM device 104 not accumulating ions in the ion guide accumulation region 138 (darker shading, left-side columns of each column pair). As can be seen from FIGS. 10A and 10B, the peak area is generally greater when ions are accumulated in the ion guide accumulation region 138 prior to exiting the SLIM device 104. As can be seen in FIGS. 10A and 10B, a 2 and 10 times improvement in MS-only mode and IM mode can be achieved, respectively, under optimized MIJ conditions. This diagnostic test also illustrates that a minimum injection time of 5 ms is required to transfer all ions from the ion guide accumulation region 138 to the split lens 202.

A third experiment was performed in substantially similar fashion to the first experiment described above, but with an MS resolution that was varied between 7,000 to 240,000, and with a maximum injection time that was fixed at 5 ms.

Figures 11A, 11B:
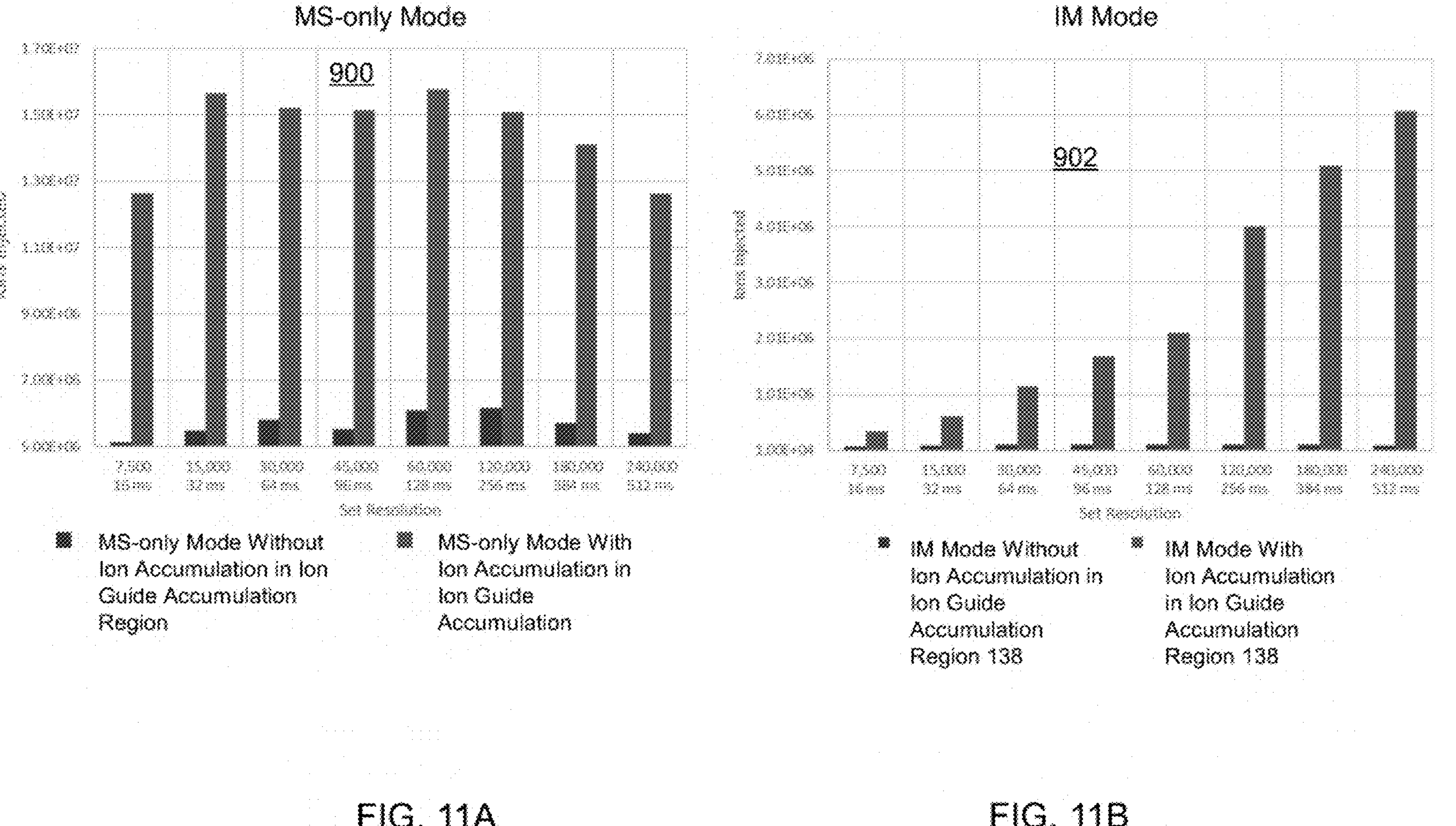
FIG. 11A is a plot of number of ions injected versus set resolution in accordance with a third experiment for six (6) seconds of continuous wave signal that were integrated showing results for the SLIM device both accumulating ions prior to release and not accumulating ions.
FIG. 11B is a plot of number of ions injected versus set resolution in accordance with the third experiment for five (5) ion mobility separations that were integrated showing results for the SLIM device both accumulating ions prior to release and not accumulating ions.

Furthermore, for the third experiment, six (6) seconds of MS-only mode operation and five (5) IM separations were integrated to compare the peak areas with the ion guide accumulation region 138 of the SLIM device 104 accumulating ions and not accumulating ions. Additionally, the number of ions injected into the mass spectrometer 200, e.g., into the C-Trap of the mass spectrometer 200, was determined by equation (1). The number of ions injected was then plotted as a function of the set resolution, as shown in FIGS. 11A and 11B. Specifically, FIG. 11A is a plot 900 of number of ions injected versus set resolution for the six (6) seconds of MS-only mode operation that were integrated showing results for (1) the SLIM device 104 accumulating ions in the ion guide accumulation region 138 and timing the release of the accumulated ions with the split lens 204 (lighter shading, right-side column of each column pair) and (2) the SLIM device 104 not accumulating ions in the ion guide accumulation region 138 (darker shading, left-side column of each column pair), and FIG. 11B is a plot 902 of number of ions injected versus set resolution for the five (5) IM separations that were integrated showing results for (1) the SLIM device 104 accumulating ions in the ion guide accumulation region 138 and timing the release of the accumulated ions with the split lens 204 (lighter shading, right-side columns of each column pair) and (2) the SLIM device 104 not accumulating ions in the ion guide accumulation region 138 (darker shading, left-side columns of each column pair). As can be seen from FIGS. 11A and 11B, at a fixed MIJ of 5 ms, accumulating ions in the ion guide accumulation region 138 prior to exiting the SLIM device 104 increases the number of ions injected by 130% to 185%. Additionally, at a fixed MIJ, the ion packet was successfully stored in the ion guide accumulation region 138 without termination of the ion packet, which illustrates that the charge capacity of the ion guide accumulation region 138 in IM mode has not been reached, even after ~500 ms of storage.

Accordingly, the foregoing illustrates that when operating in MS-only mode, accumulating ions in the ion guide accumulation region 138 and timing the release of the accumulated ions with the opening of the pre-MS ion gating element 204 has an increased signal (>100%), and that ions are not being lost in IM mode during long accumulation times on the ion guide accumulation region 138.

Therefore, in accordance with embodiments of the present disclosure, it has been demonstrated that accumulating ions in the ion guide accumulation region 138 and timing the release of the accumulated ions with the opening of the pre-MS ion gating element 204 can achieve up to a 20% and 50% increase in signal intensity in MS-only mode and IM mode, respectively, when the maximum injection time equals the transient length. This improvement in signal intensity directly correlates to a reduction in ion loss when the pre-MS ion gating element 204 is closed, with the largest reduction being observed in lower mass resolution modes. However, at longer maximum injection times and higher resolutions, the charge capacity of a C-Trap associated with the mass spectrometer 200 can reduce the theoretically achievable signal improvement. Additionally, varying the maximum injection time at a fixed resolution has shown that the highest m/z 2700 ions can take 5 ms to transfer from the ion guide accumulation region 138 to the pre-MS ion gating element 204. At a fixed maximum injection time of 5 ms, it has been observed that the signal intensity has increased in MS-only mode (>100%) across all resolutions and that ions are not lost during long accumulation times on the ion guide accumulation region 138.

Accordingly, in accordance with the present disclosure, a high amplitude blocking/gating DC voltage can be applied to the row of segmented electrodes **122*h* that form the ion guide accumulation region gate 142 in order to generate a potential wall that causes ions to accumulate in the ion guide accumulation region 138 (e.g., adjacent the exit optics of the SLIM transfer device 104) when the pre-MS ion gating element 204 is closed. Once the pre-MS ion gating element 204 is open, the ions trapped in the ion guide accumulation region 138 will be released and transferred to the pre-MS ion gating element 204 and the mass spectrometer 200. Synchronization of the pre-MS ion gating element 204 with the SLIM transfer device 104** can be implemented to control the transfer of ions, and as such, greatly improve the ion utilization efficiency and sensitivity. This functionality is distinct from, for example, prior art systems because it provides a mechanism for continuously accumulating ions over longer periods of time such that it is compatible with low acquisition rate (<1,000 Hz) downstream analyzers which incorporate an inherent "dead time" in the analysis cycle that reduces the duty cycle of ion transmission. Thus, the present disclosure provides for both continuous operation (nearly 100% duty cycle) with extended ion accumulation periods (>10 ms), which is lacking in prior art examples of ion storage prior to mass analysis.

Figure 12:
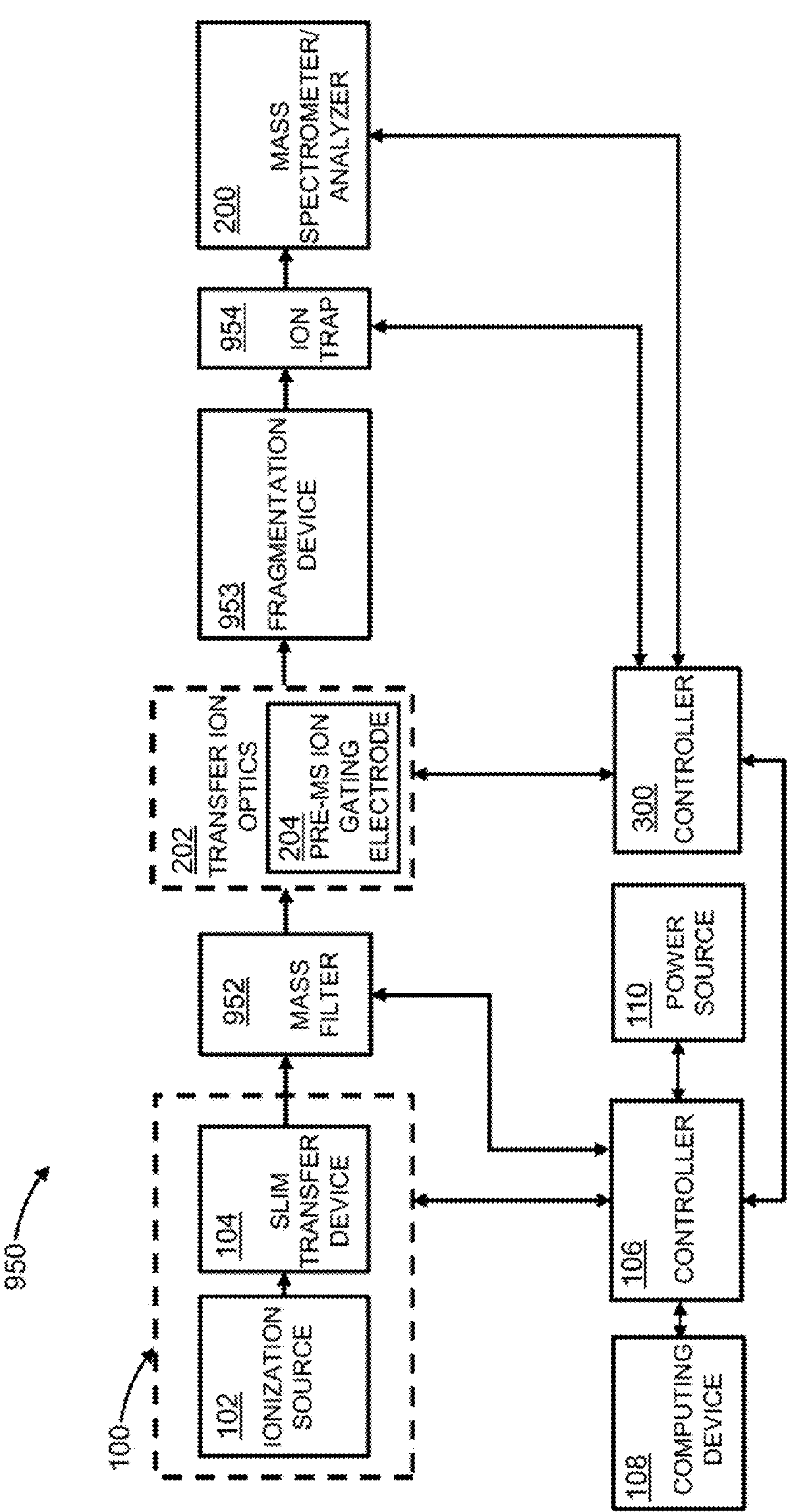
FIG. 12 is a schematic diagram of another exemplary IMS-MS system of the present disclosure.

FIG. 12 is a schematic diagram of another exemplary IMS-MS system 950 of the present disclosure. The IMS-MS system 950 illustrated in FIG. 12 is similar to the IMS-MS system 10 shown in FIG. 1 and described in connection therewith, but illustrates a mass filter 952 positioned downstream of the SLIM transfer device 104, an optional fragmentation device 953, and an ion trap 954 positioned downstream of the transfer ion optics 202. In particular, the mass filter 952 can be positioned between the SLIM transfer device 104 and the transfer ion optics 202 while the ion trap 954 can be positioned between the transfer ion optics 202 and the mass spectrometer/analyzer 200. In other embodiments, the ion trap 954 can be the mass spectrometer/analyzer 200, such that they are a single unit/component, e.g., for a linear ion trap.

The mass filter 952 is configured to receive ions from the SLIM transfer device 104, filter ions as they pass therethrough, and provide the filtered ions to the fragmentation device 953 or the transfer ion optics 202, e.g., if the system 950 does not include a fragmentation device 953. The mass filter 952 can be, for example, a quadrupole, magnetic sector, Wein filter, or other mass filtering device that filters the received ions, e.g., based on a mass-to-charge (m/z) ratio, as they pass therethrough. In this regard, the mass filter 952 can operate as a band-pass filter that permits only ions having a mass-to-charge ratio within a pre-determined mass-to-charge ratio band to pass therethrough during a set time period. The set time period can be based on an arrival time of ions at the mass filter 952 that is synchronized with or linked to the release of ions from the first onboard accumulation region 136, e.g., opening of the pre-IMS accumulation region gate 140, which is discussed in greater detail below. It should be understood, that the present invention also contemplates that the foregoing synchronization or link between the mass filter 952 and the first onboard accumulation region 136 can be based on the mass filter 952 instead of the release of ions from the first onboard accumulation region 136. For example, the release of ions from the first onboard accumulation region 136 can be triggered by the mass filter 952.

Additionally, the mass filter 952 can be configured to operate during multiple different time periods, which can be sequential time periods, that each have a respective mass-to-charge ratio band associated therewith. Each time period and associated mass-to-charge ratio band can be referred to colloquially as an isolation window or frame. Two or more different isolation windows can have overlapping mass-to-charge ratio bands. For example, a first isolation window can operate between an ion arrival time of 300-400 ms and have a mass-to-charge ratio band of 280-500, a second isolation window can operate between an ion arrival time of 400-500 ms and have a mass-to-charge ratio band of 380-600, and a third isolation window can operate between an ion arrival time of 500-600 ms and have a mass-to-charge ratio band of 480-700. Thus, the mass-to-charge ratio bands of all three of the foregoing exemplary isolation windows overlap with each other. Additionally, the isolation windows can be configured to filter singly charged ions and permit multiply charged ions to pass therethrough based on timing of opening and closing, e.g., when the filtering operation starts and stops. That is, the mass filter 952 can be used for charge state selection in addition to m/z selection.

Furthermore, the mass filter 952 can be configured such that the operational mass-to-charge ratio band thereof, e.g., the range of mass-to-charge ratios that the mass filter 952 permits to pass through, can be ramped over a given arrival time period instead of dwelling at a particular range of mass-to-charge ratios for the entirety of the arrival time period, as described above. In such a configuration, the mass-to-charge ratio band for a particular isolation window could be variable, e.g., linearly or non-linearly, or adjustable over an arrival time period. For example, the above-described first isolation window between an ion arrival time of 300-400 ms could start with a mass-to-charge ratio band of 280-500, e.g., at arrival time 300 ms, that is gradually and sequentially increased during the 300-400 ms arrival time period to a mass-to-charge ratio band of 380-600 at the 400 ms arrival time. This functionality could be used to selectively isolate different chemical classes, e.g., peptides, lipids, glycans, metabolites, etc., since these chemical classes often include ions that are partially or fully separated in the arrival time to m/z space according to a unique relationship, e.g., slope or trendline, that can be leveraged in order to selectively filter and transmit the ions from the targeted chemical class. For example, as explained above, the m/z band could be ramped over a given arrival time period in accordance with the unique relationship, e.g., slope or trendline, for the targeted chemical class.

As previously noted, the mass filter 952 is synchronized with the opening of the pre-IMS accumulation region gate 140 and release of ions from the first onboard accumulation region 136. More specifically, the opening and closing of each isolation window of the mass filter 952 can be measured from the opening of the pre-IMS accumulation region gate 140 and release of ions from the first onboard accumulation region 136, which would be time 0. This allows the mass filter 952 to also be used for charge state selection, in addition to m/z filtering and chemical class selection noted above, as the isolation windows can be configured to overlap the ion intensity bands for singly or multiply charged ions and thus permit only singly or multiply charged ions to pass therethrough while filtering out ions with other charge states. One benefit of this functionality over the prior art is that charge state selection and filtering does not have to be performed prior to accumulating ions, e.g., in the second onboard accumulation region 138, but instead all ions that arrive at the second onboard accumulation region 138 during a period of time can be indiscriminately accumulated therein and released to the mass filter 952, which is possible due to the ion trapping capacity of the second onboard accumulation region 138. In contrast, prior art systems do not have ion accumulation regions or traps of sufficient capacity to indiscriminately accumulate ions regardless of charge state, but instead must filter ions before or during accumulation to reduce the number of charges and avoid space charge effects.

Additionally, the mass filter 952 can be controlled by the first controller 106, which can synchronize the mass filter 952 with the IMS system 100, e.g., the opening of the pre-IMS accumulation region gate 140 and release of ions from the first onboard accumulation region 136. This synchronization can include controlling at least one aspect of the mass filter 952 based on the state or change in state of the first onboard accumulation region 136. The controlled aspect can be an operation of the mass filter 952, such as a filtering operation, a timing for starting and/or stopping a filtering operation (e.g., the opening and closing of one or more isolation windows), or the calculation/measuring of an ion arrival time at the mass filter.

The fragmentation device 953 can be optionally included in the system 950 to fragment ions and allow for MS/MS analysis, and can be any fragmentation device known in the art. The system 950 can also be operated with the fragmentation device 953 in a pass-through mode during which the fragmentation device 953 does not fragment ions, but instead allows ions to pass therethrough to the ion trap 954 whole. In this regard, the system 950 can alternate scans between not fragmenting ions and fragmenting ions to correlate precursor ions (ions that were not fragmented) with fragment ions.

The ion trap 954 can be, for example, a C-trap or other ion trap/guide, that is configured to receive ions from the transfer ion optics 202, and trap and accumulate the received ions. In this regard, the ion trap 954 traps and accumulates ions prior to releasing the trapped/accumulated ions to be mass analyzed by the mass spectrometer/analyzer 200. The ion trap 954 can be controlled by the second controller 300, and can be synchronized with or otherwise dependent upon the mass spectrometer/analyzer 200, the transfer ion optics 202, e.g., the pre-MS ion gating electrode 204, and/or the SLIM transfer device 104, e.g., the ion guide accumulation region 138 and/or the ion guide accumulation region gate 142.

Figure 13:
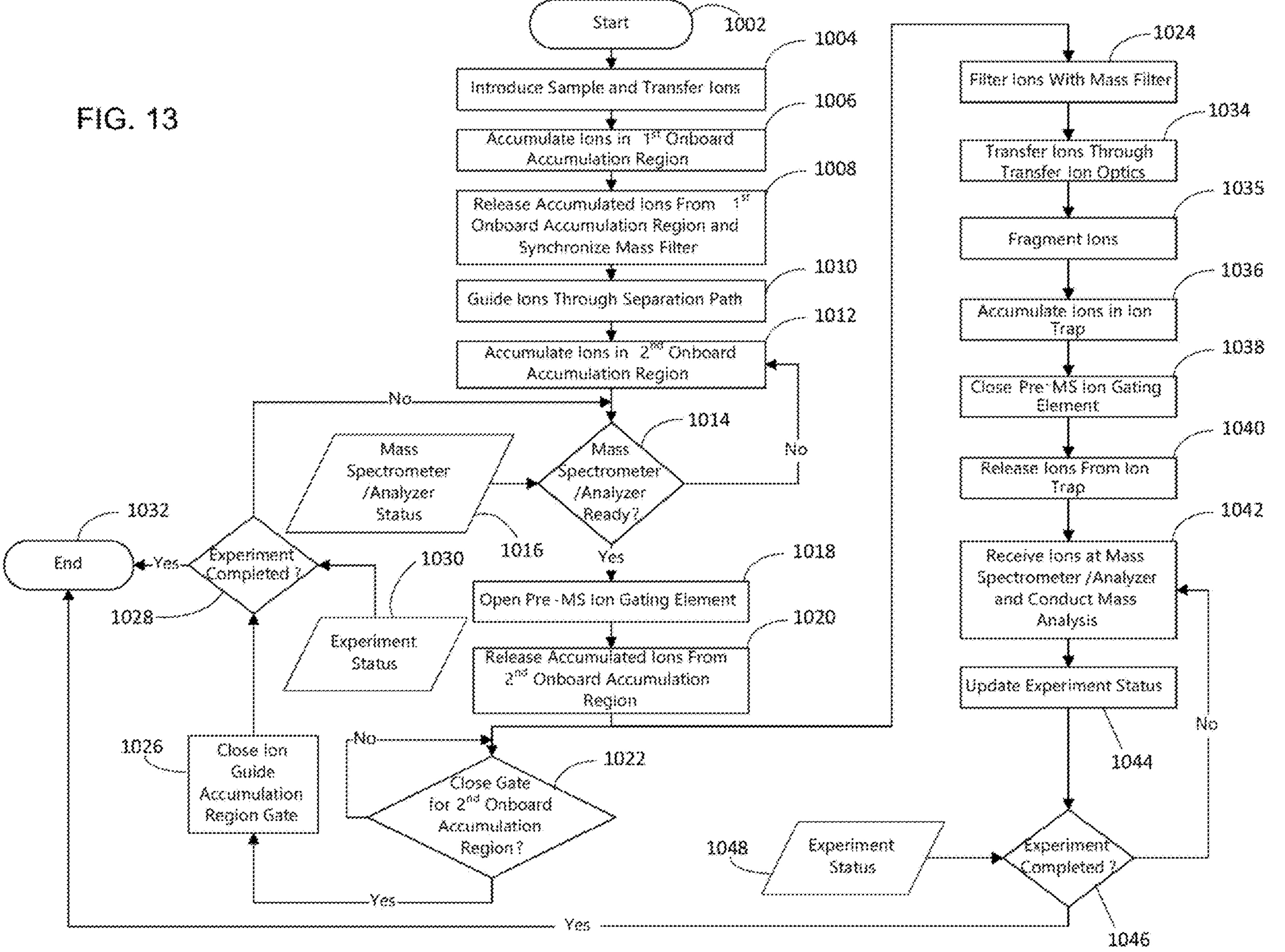
FIG. 13 is a flow chart illustrating an exemplary method for conducting mass analysis of a sample carried out by the IMS-MS system of FIG. 12.

FIG. 13 is a flow chart 1000 illustrating an exemplary method for conducting mass analysis of a sample carried out by the IMS-MS system 950 of FIG. 12. The method begins in step 1002 in which an experiment is started. It should be understood that a single experiment can involve the mass spectrometer/analyzer 200 conducting multiple mass analyses of different groups of ions. In step 1004 a sample of ions is introduced into the SLIM transfer device 104 at the inlet region 132 and transferred along the ion manipulation path 130 to the first onboard accumulation region 136. For example, the sample can be first ionized by the ionization source 102 and introduced into the SLIM transfer device 104 through the inlet orifice plate 126. Next, in step 1006, the ions transferred through the ion manipulation path 130 are accumulated in the first onboard accumulation region 136.

In step 1008, the ions accumulated in the first onboard accumulation region 136 are released therefrom, which can be effectuated by changing the state of the pre-IMS accumulation region gate 140, as discussed in connection with FIG. 4. Step 1008 can be triggered based on various different considerations, including, but not limited to, an amount of time for which the first onboard accumulation region 136 has been accumulating ions, a number of ions accumulated in the first onboard accumulation region 136, a number of charges accumulated in the first onboard accumulation region 136, a signal received from the mass filter 952, etc. Additionally, in step 1008, the mass filter 952 can be triggered once the ions are released from the first onboard accumulation region 136, e.g., once the pre-IMS accumulation region gate 140 is "opened." For example, a timer can be started for measuring ion arrival time at the mass filter 952, such that the mass filter 952 is synchronized with the release of ions from the first onboard accumulation region 136. The timer can be used in connection with or for controlling the mass filter 952, e.g., in determining the ion arrival time at the mass filter 952, such that the pre-IMS accumulation region gate 140 and the mass filter 952 are keyed to each other or otherwise synchronized, as discussed in connection with FIG. 12. Alternatively, the release of ions from the first onboard accumulation region 136 can be triggered based on the mass filter 952.

Once the ions are released from the first onboard accumulation region 136, the released ions are then guided or transferred through the separation path 137 in step 1010 where the ions undergo ion mobility separation. Next, in step 1012, a first group of ions is accumulated in the second onboard accumulation region 138. The process then proceeds to step 1014 in which a determination is made as to whether the mass spectrometer/analyzer 200 is ready, e.g., ready to receive ions and conduct a mass analysis, based on a status of the mass spectrometer/analyzer 200 provided as data 1016, which can be updated on a regular and continuous basis throughout an experiment, e.g., every millisecond, etc.

If a negative determination is made in step 1014, e.g., the mass spectrometer/analyzer 200 is not ready, then the pre-MS ion gating element 204 and the ion guide accumulation region gate 142 remain closed, and the second onboard accumulation region 1012 continues to accumulate ions. If a positive determination is made in step 1014, e.g., the mass spectrometer/analyzer 200 is ready, then the process proceeds to step 1018 and the pre-MS ion gating element 204 is opened. Once the pre-MS ion gating element 204 is opened, the process proceeds to step 1020 and the ions accumulated in the second onboard accumulation region 138 are released, which can be effectuated by changing the state of the ion guide accumulation region gate 142, as discussed in connection with FIG. 4. As previously discussed, the ion guide accumulation region gate 142 can be controlled by the first controller 106 based on a signal from the second controller 300 and/or the status of the pre-MS ion gating element 204. For example, the ion guide accumulation region gate 142 can be configured such that it is not switched to an "open" state unless the pre-MS ion gating element 204 is in an open state. However, it should be understood that the ion guide accumulation region gate 142 need not switch to an "open" state immediately upon the pre-MS ion gating element 204 switching to an open state, but instead can accumulate ions for a longer period of time if so desired. That is to say, the accumulation time of the second onboard accumulation region 138 can be modulated so long as the accumulated ions are released therefrom only when the pre-MS ion gating element 204 is in an open state.

Next, the process branches and proceeds to steps 1022 and 1024. In step 1022, a determination is made as to whether the ion guide accumulation region gate 142 for the second onboard accumulation region 138 should be "closed." This determination can be based on time, whether all ions have exited the second onboard accumulation region 138, or some other consideration. If a negative determination is made in step 1022, then the process loops back and continues to monitor whether the ion guide accumulation region gate 142 should be "closed." Once a positive determination is made in step 1022, the process proceeds to step 1026 and the ion guide accumulation region gate 142 is "closed." Next, in step 1028 a determination is made as to whether the experiment is completed based on experiment status data 1030, which can be updated on a regular and continuous basis throughout an experiment, e.g., every millisecond, etc. In particular, a single experiment can involve accumulating and releasing multiple separate packets of ions in and from the second onboard accumulation region 1012 for a single sample introduced in step 1004 and/or ion packet accumulated in and released from the first onboard accumulation region 136 in step 1008. If a positive determination is made in step 1028, e.g., the experiment is completed, then the process 1000 proceeds to step 1032 and the process ends. If a negative determination is made in step 1028, e.g., the experiment is not completed, then a second group of ions will have been accumulated in the second onboard accumulation region 138, and the process 1000 returns to step 1014 and proceeds to steps 1018 and 1020 to essentially determine whether the second group of ions that have accumulated in the second onboard accumulation region 138 should be released. Of course, this process can repeat for multiple ion accumulations (e.g., packets) until the experiment is completed.

As previously mentioned, after the ions are released from the second onboard accumulation region in step 1020, the process 1000 proceeds to step 1024. In step 1024, the released ions are filtered with the mass filter 952, as described in connection with FIG. 12, for example. In step 1034, the ions that have passed through the mass filter 952 are then transferred through the transfer ion optics 202 including the pre-MS ion gating electrode 204, which is open. In step 1035, the ions transferred through the transfer ion optics 202 are optionally fragmented by the fragmentation device 953. As previously described, the system 950 can alternate scans between not fragmenting ions and fragmenting ions to correlate precursor ions (ions that were not fragmented) with fragment ions. In step 1036, the ions (fragmented or not fragmented) are then accumulated in the ion trap 954. In step 1038, the pre-MS ion gating element 142 can be closed to prevent additional ions from entering the ion trap 954. In step 1040, the ions are released from the ion trap 954, which can be based on one or more considerations, e.g., based on time, a signal from the mass spectrometer/analyzer 200, etc. In step 1042, the ions released from the ion trap 954 are analyzed by the mass spectrometer/analyzer 200. In step 1044, the experiment status is updated, e.g., the status can be switched to completed if the mass analysis is completed and no more ion packets are to be analyzed. Next, in step 1046 a determination is made as to whether the experiment is completed based on experiment status data 1048, which can be based on step 1044 and also updated on a regular and continuous basis throughout an experiment, e.g., every millisecond, etc. If a positive determination is made in step 1046, e.g., the experiment is completed, then the process 1000 proceeds to step 1032 and the process ends. If a negative determination is made in step 1028, e.g., the experiment is not completed, then the process returns to step 1042 and the next packet of ions is analyzed by the mass spectrometer/analyzer 200. Accordingly, the mass spectrometer/analyzer 200 analyzes each ion packet released from the second onboard accumulation region 138 and ion trap 954 for an entire experiment.

Thus, for each ion mobility experiment the first onboard accumulation region 136 will experience one ion accumulation and release event, while the second onboard accumulation region 138 and the ion trap 954 can experience multiple ion accumulation and release events. Generally, the second onboard accumulation region 138 and the ion trap 954 will experience the same number of ion accumulation and release events per ion mobility experiment.

Figure 14:
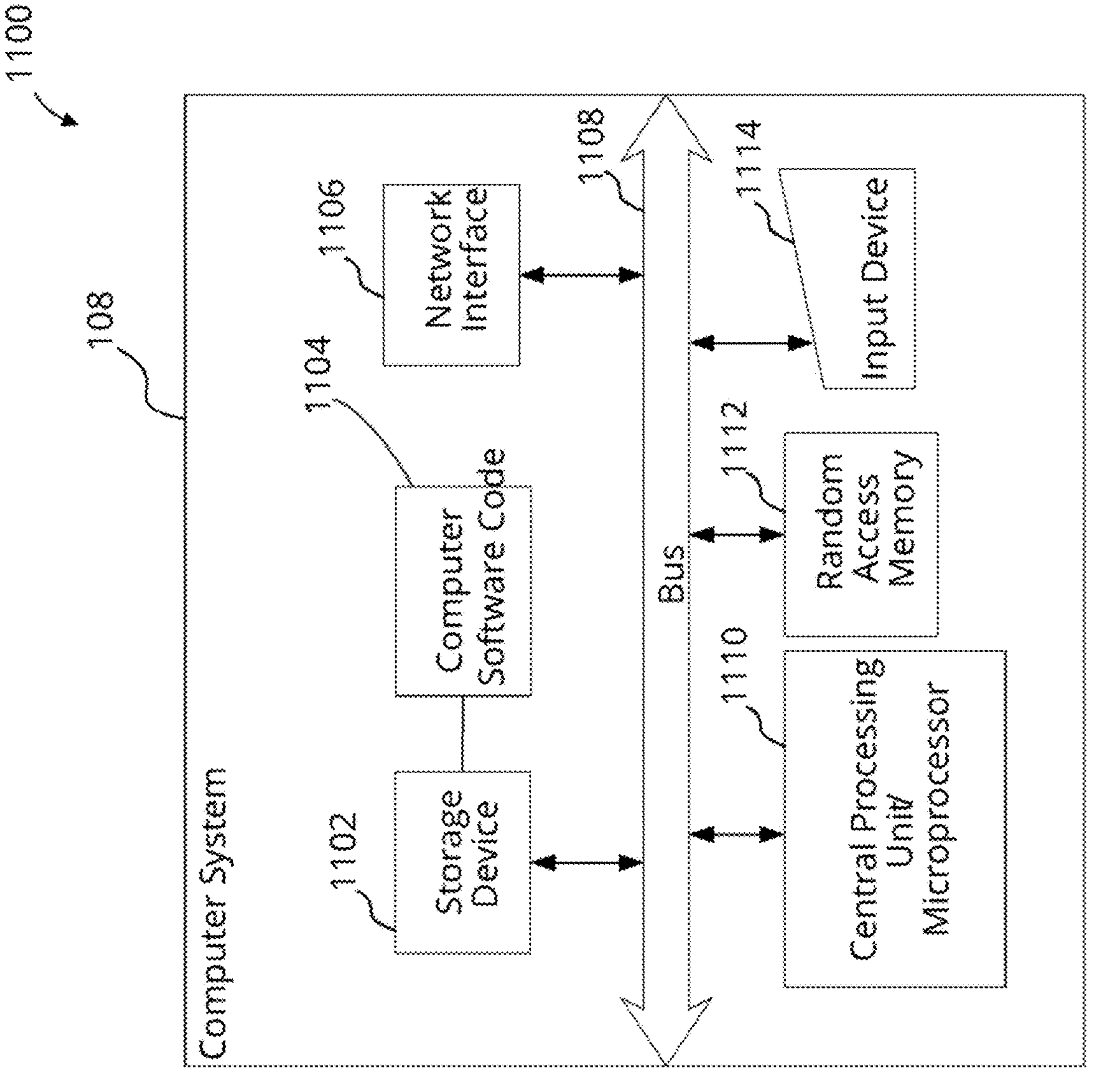
FIG. 14 is a diagram showing hardware and software components capable of being utilized to implement embodiments of the system of the present disclosure.

FIG. 14 is a diagram 1100 showing hardware and software components of the computer system 108 on which aspects of the present disclosure can be implemented. The computer system 108 can include a storage device 1102, computer software code 1104, a network interface 1106, a communications bus 1108, a central processing unit (CPU) (microprocessor) 1110, random access memory (RAM) 1112, and one or more input devices 1114, such as a keyboard, mouse, etc. It is noted that the CPU 1110 could also include, or be configured as, one or more graphics processing units (GPUs). The computer system 108 could also include a display (e.g., liquid crystal display (LCD), cathode ray tube (CRT), and the like). The storage device 1102 could comprise any suitable computer-readable storage medium, such as a disk, non-volatile memory (e.g., read-only memory (ROM), erasable programmable ROM (EPROM), electrically-erasable programmable ROM (EEPROM), flash memory, field-programmable gate array (FPGA), and the like). The computer system 108 could be a networked computer system, a personal computer, a server, a smart phone, tablet computer, etc.

The functionality provided by the present disclosure could be provided by the computer software code 1104, which each could be embodied as computer-readable program code (e.g., algorithm) stored on the storage device 1102 and executed by the computer system 108 using any suitable, high or low level computing language, such as Python, Java, C, C++, C#, .NET, MATLAB, etc. A network interface 1106 could include an Ethernet network interface device, a wireless network interface device, or any other suitable device which permits the computer system 108 to communicate via a network. The CPU 1110 could include any suitable single-core or multiple-core microprocessor of any suitable architecture that is capable of implementing and running the computer software code 1104 (e.g., Intel processor). The random access memory 1112 could include any suitable, high-speed, random access memory typical of most modern computers, such as dynamic RAM (DRAM), etc.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. An ion mobility spectrometry (IMS) device and downstream gating element, comprising:

at least one surface;

a first plurality of electrodes disposed on the at least one surface, the first plurality of electrodes configured to receive a first voltage signal and generate at least a portion of a first pseudopotential that inhibits ions from approaching the at least one surface;

a second plurality of electrodes disposed on the at least one surface, the second plurality of electrodes configured to receive a second voltage signal and generate a drive potential; and an ion path adjacent the at least one surface and extending between an inlet and an outlet, the ion path including:

a first accumulation region configured to switch between a first accumulation state and a first release state, the first accumulation region accumulating ions when in the accumulation state and permitting ions to pass therethrough when in the release state, the first accumulation region being synchronized with a mass filter downstream of the IMS device, a separation region positioned downstream of the first accumulation region and configured to temporally separate ions based on mobility, and a second accumulation region downstream of the separation region and configured to receive the temporally separated ions from the separation region and switch between a second accumulation state and a second release state, the second accumulation region accumulating ions when in the accumulation state and permitting ions to pass therethrough when in the release state, an electrode gate positioned adjacent the second accumulation region and configured to be switched between a first state and a second state, generate a first electric field in the first state, and generate a second electric field in the second state and a gating element positioned downstream of the IMS device and configured to control the flow of ions to a mass analyzer, and wherein the state of the second accumulation region being dependent upon the state of the gating element, wherein the first electric field is configured to guide the ions along the ion path and the second electric field is configured to prevent the ions from traversing the electrode gate and to cause ions to accumulate in the second accumulation region, wherein the state of the electrode gate is substantially synchronized with and dependent upon the state of the gating element and wherein the IMS device is configured to receive a sample of ions, guide the ions through the ion path, temporally separate the ions, and discharge the ions.

2. The IMS device and gating element of claim 1, wherein synchronization of the first accumulation region with the mass filter includes linking at least one aspect of the mass filter with the state or a change in the state of the first accumulation region.

3. The IMS device and gating element of claim 2, wherein the at least one aspect is an operation of the mass filter.

4. The IMS device and gating element of claim 3, wherein the operation is at least one ion filtering operation.

5. The IMS device and gating element of claim 2, wherein the at least one aspect is a timing for starting and stopping at least one ion filtering operation.

6. The IMS device and gating element of claim 1, wherein synchronization of the first accumulation region with the mass filter includes linking an ion arrival time at the mass filter with the state or a change in the state of the first accumulation region.

7. The IMS device and gating element of claim 1, wherein the second accumulation region is configured to accumulate ions regardless of ion charge state or m/z.

8. The IMS device and gating element of claim 1, comprising the mass filter.

9. The IMS device and gating element of claim 1, wherein the second accumulation region is configured to be switched to the second release state when the gating element is in an open state in which ions are permitted to flow through the gating element, and to be switched to the second accumulation state when the gating element is in a closed state in which ions are prevented from flowing through the gating element.

10. The IMS device and gating element of claim 1, wherein the electrode gate is configured to be switched to the first state when the gating element is in an open state in which ions are permitted to flow through the gating element, and to be switched to the second state when the gating element is in a closed state in which ions are prevented from flowing through the gating element.

11. The IMS device and gating element of claim 1, comprising:

a controller, wherein the controller receives a timing signal and controls the state of the second accumulation region based on the timing signal.

12. The IMS device and gating element of claim 1, wherein the IMS device has a duty cycle approaching 100%.

13. A method of accumulating and releasing ions with an IMS device based on a state of a downstream gating element configured to control the flow of ions to a mass analyzer, comprising:

introducing ions into the IMS device, the IMS device including:

at least one surface, a first plurality of electrodes disposed on the at least one surface, the first plurality of electrodes configured to receive a first voltage signal and generate at least a portion of a first pseudopotential that inhibits ions from approaching the at least one surface;

a second plurality of electrodes disposed on the at least one surface, the second plurality of electrodes configured to receive a second voltage signal and generate a drive potential, and an ion path adjacent the at least one surface and extending between an inlet and an outlet, the ion path including:

a first accumulation region configured to switch between a first accumulation state and a first release state, a separation region positioned downstream of the first accumulation region and configured to temporally separate ions based on mobility, and a second accumulation region downstream of the separation region and configured to receive the temporally separated ions from the separation region and switch between a second accumulation state and a second release state;

guiding the ions along the ion path;

accumulating ions in the first accumulation region;

releasing the accumulated ions from the first accumulation region into the separation region;

synchronizing a mass filter downstream of the IMS device with the first accumulation region;

temporally separating the ions based on mobility as they are guided through the separation region;

receiving the temporally separated ions at the second accumulation region;

receiving, at the IMS device, a signal indicative of the state of the gating element; and causing the second accumulation region to operate in one of the accumulation state and the release state based on the received signal.

14. The method of claim 13, wherein the step of synchronizing the mass filter with the first accumulation region includes linking at least one aspect of the mass filter with the state or a change in the state of the first accumulation region.

15. The method of claim 14, wherein the at least one aspect is an operation of the mass filter.

16. The method of claim 15, wherein the operation is at least one ion filtering operation.

17. The method of claim 14, wherein the at least one aspect is a timing for starting and stopping at least one ion filtering operation.

18. The method of claim 13, wherein the step of synchronizing the mass filter with the first accumulation region includes linking an ion arrival time at the mass filter with the state or a change in the state of the first accumulation region.

19. The method of claim 13, wherein the second accumulation region is configured to accumulate ions regardless of ion charge state or m/z.

20. The method of claim 13, wherein causing the second accumulation region to operate in one of the second accumulation state and the second release state based on the received signal comprises:

causing the second accumulation region to operate in the second accumulation state when the signal is indicative of the gating element being in a closed state in which ions are prevented from flowing through the gating element; and causing the second accumulation region to operate in the second release state when the signal is indicative of the gating element being in an open state in which ions are permitted to flow through the gating element.

21. The method of claim 13, wherein the IMS device includes an electrode gate positioned adjacent the second accumulation region, and wherein causing the second accumulation region to operate in one of the second accumulation state and the second release state based on the received signal includes:

generating with the electrode gate a first electric field to cause the second accumulation region to operate in the second release state, the first electric field configured to guide ions along the ion path; and generating with the electrode gate a second electric field to cause the second accumulation region to operate in the second accumulation state, the second electric field configured to prevent the ions from traversing the electrode gate and to cause ions to accumulate in the second accumulation region.

22. The method of claim 21, wherein the electrode gate generates the first electric field when the signal is indicative of the gating element being in an open state in which ions are permitted to flow through the gating element, and the electrode gate generates the second electric field when the signal is indicative of the gating element being in a closed state in which ions are prevented from flowing through the gating element.

23. The method of claim 13, comprising:

receiving, at a controller in communication with the IMS device, a timing signal; and controlling the state of the second accumulation region based on the timing signal.

24. The method of claim 13, wherein the IMS device has a duty cycle approaching 100%.

* * * * *